(12) United States Patent
Aiken et al.

(10) Patent No.: US 11,822,857 B2
(45) Date of Patent: Nov. 21, 2023

(54) ARCHITECTURE FOR A HUB CONFIGURED TO CONTROL A SECOND DEVICE WHILE A CONNECTION TO A REMOTE SYSTEM IS UNAVAILABLE

(71) Applicant: Amazon Technologies, Inc., Seattle, WA (US)

(72) Inventors: Mark Aran Aiken, Seattle, WA (US); Stanislaw Ignacy Pasko, Gdańsk (PL); Olusanya Temitope Soyannwo, San Jose, CA (US); Vibhav Hemant Salgaonkar, Seattle, WA (US); Adam Barry Fineberg, Saratoga, CA (US); Roger Robert Webster, Los Altos, CA (US); Makarand Damle, Sunnyvale, CA (US); Rohan Mutagi, Redmond, WA (US); Philip Alexander Lee, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 212 days.

(21) Appl. No.: 16/924,835

(22) Filed: Jul. 9, 2020

(65) Prior Publication Data

US 2020/0409657 A1    Dec. 31, 2020

Related U.S. Application Data

(63) Continuation of application No. 15/839,750, filed on Dec. 12, 2017, now Pat. No. 10,713,007.

(51) Int. Cl.
*G10L 15/22* (2006.01)
*G06F 3/16* (2006.01)
(Continued)

(52) U.S. Cl.
CPC .............. *G06F 3/167* (2013.01); *G10L 15/22* (2013.01); *G10L 15/26* (2013.01); *H04L 12/282* (2013.01);
(Continued)

(58) Field of Classification Search
CPC ............................ G10L 15/22; G06F 17/30654
See application file for complete search history.

(56) References Cited

U.S. PATENT DOCUMENTS 7,418,392 B1    8/2008    Mozer et al.
7,720,683 B1    5/2010    Vermeulen et al.
(Continued)

FOREIGN PATENT DOCUMENTS

CN    101366074 A    2/2009
CN    102263863 A    11/2011
(Continued)

OTHER PUBLICATIONS

Chinese Office Action dated Feb. 3, 2020, for Chinese Patent Application No. 201580042259.5, a counterpart foreing application of the U.S. Pat. No. 9,548,066, 8 pages.
(Continued)

*Primary Examiner* — Feng-Tzer Tzeng
(74) *Attorney, Agent, or Firm* — Lee & Hayes, P.C.

(57) ABSTRACT

A hub is configured to provide voice control without assistance from a remote system, which allows the hub to provide a user with the ability to control second devices in an environment by issuing voice commands, even when the hub is unable to communicate with the remote system over a wide area network (e.g., the Internet). The hub is also configured to execute rules without assistance from the remote system, which allows the hub to execute rules, even when the hub is unable to communicate with the remote system over a wide area network (e.g., the Internet).

20 Claims, 10 Drawing Sheets

(51) Int. Cl.
  *H04L 12/28* (2006.01)
  *G10L 15/26* (2006.01)
  *H04M 1/72415* (2021.01)
  *G10L 15/32* (2013.01)
  *G10L 15/30* (2013.01)
  *G10L 15/18* (2013.01)

(52) U.S. Cl.
  CPC ...... *H04L 12/2829* (2013.01); *H04L 12/2834* (2013.01); *H04M 1/72415* (2021.01); *G10L 15/1822* (2013.01); *G10L 15/30* (2013.01); *G10L 15/32* (2013.01); *G10L 2015/223* (2013.01); *G10L 2015/228* (2013.01); *H04M 2250/74* (2013.01)

(56) References Cited

U.S. PATENT DOCUMENTS

| | | | |
|---|---|---|---|
| 7,774,204 | B2 | 8/2010 | Mozer et al. |
| 8,515,766 | B1 | 8/2013 | Bringert et al. |
| 9,171,066 | B2* | 10/2015 | Hebert .................... G10L 15/22 |
| 2009/0150156 | A1 | 6/2009 | Kennewick et al. |
| 2009/0199118 | A1* | 8/2009 | Sabato ................ G06F 11/3476 715/765 |
| 2010/0031299 | A1* | 2/2010 | Harrang ............. H04N 21/4363 725/80 |
| 2010/0145683 | A1 | 6/2010 | Schroeter |
| 2010/0217604 | A1 | 8/2010 | Baldwin et al. |
| 2012/0223885 | A1 | 9/2012 | Perez |
| 2012/0253790 | A1 | 10/2012 | Heck et al. |
| 2013/0085753 | A1 | 4/2013 | Bringert et al. |
| 2013/0124207 | A1* | 5/2013 | Sarin ...................... G06F 3/167 704/E11.001 |
| 2014/0109152 | A1* | 4/2014 | Christensen ....... H04N 21/8166 725/58 |
| 2014/0222422 | A1 | 8/2014 | Sarikaya et al. |
| 2014/0365209 | A1 | 12/2014 | Evermann |
| 2015/0142447 | A1 | 5/2015 | Kennewick et al. |
| 2016/0042748 | A1 | 2/2016 | Jain et al. |
| 2019/0179610 | A1 | 6/2019 | Aiken et al. |

FOREIGN PATENT DOCUMENTS

| | | |
|---|---|---|
| CN | 110019743 A * | 7/2018 |
| EP | 2801973 | 11/2014 |
| JP | 2009505140 | 2/2009 |
| JP | 2012518847 | 8/2012 |
| JP | 2013510341 | 3/2013 |
| WO | WO2011088053 A2 | 7/2011 |

OTHER PUBLICATIONS

Chinese Office Action dated Feb. 3, 2020, for Chinese Patent Application No. 201580042259.5, a counterpart foreing application of the U.S. Pat. No. 9,548,066, 15 pages.
PCT Invitation to Pay Additional Fees, mailed Mar. 29, 2019 for PCT Application No. PCT/US2018/065267, 10 pages.
Translated Japanese Office Action dated Apr. 24, 2018 for Japanese Patent Application No. 2017-506995, a counterpart foreign application of U.S. Pat. No. 9,548,066, 5 pages.
"Must read! Apps that should not be stopped [Android 4.0 or later only]", retrieved on Apr. 24, 2018 at <<https://andronavi.com/2013/04/264555>>, Apr. 19, 2013, 4 pages.
Non Final Office Action dated Feb. 28, 2019 for U.S. Appl. No. 15/839,750 "Architecture for a Hub Configured to Control a Second Device While a Connection to a Remote System is Unavailable" Aiken, 11 pages.
Office action for U.S. Appl. No. 14/456,620 dated Nov. 9, 2015, Jain et al., "Voice Application Architecture", 13 pages.
Office action for U.S. Appl. No. 14/456,620, dated Jun. 2, 2016, Jain et al., "Voice Application Architecture", 17 pages.
Office Action for U.S. Appl. No. 15/839,750, dated Aug. 23, 2019, Aiken, "Architecture for a Hub Configured to Control a Second Device While a Connection to a Remote System is Unavailable", 13 pages.
PCT Search Report and Written Opinion dated Oct. 12, 2015 for PCT Application No. PCT/US15/41186, 10 pages.
PCT Search Report and Written Opinion dated May 21, 2019 for PCT Application No. PCT/US2018/065267, 16 pages.
Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

* cited by examiner

ARCHITECTURE FOR A HUB CONFIGURED TO CONTROL A SECOND DEVICE WHILE A CONNECTION TO A REMOTE SYSTEM IS UNAVAILABLE

CROSS REFERENCE TO RELATED APPLICATION

This application is a continuation of co-pending, commonly owned U.S. patent application Ser. No. 15/839,750, filed Dec. 12, 2017, and entitled "ARCHITECTURE FOR A HUB CONFIGURED TO CONTROL A SECOND DEVICE WHILE A CONNECTION TO A REMOTE SYSTEM IS UNAVAILABLE," the entirety of which is herein incorporated by reference.

BACKGROUND

Homes and other user premises are increasingly equipped with always-on Internet or "cloud" connectivity. The constant, or nearly constant, availability of wide area network communications, in combination with increasing capabilities of computing devices—including hands-free, speech interface devices and other smart home devices—have created a number of new possibilities for services that use in-home connected devices. For example, various cloud-based services (e.g., music streaming, smart home control, etc.) may be accessible to users through convenient, hands-free interaction with their in-home speech interface devices.

Provided herein are technical solutions to improve and enhance these and other systems.

BRIEF DESCRIPTION OF THE DRAWINGS

The detailed description is described with reference to the accompanying drawings. In the figures, the left-most digit(s) of a reference number identifies the figure in which the reference number first appears. The use of the same reference numbers in different figures indicates similar or identical components or features.

DETAILED DESCRIPTION

Figure 1:
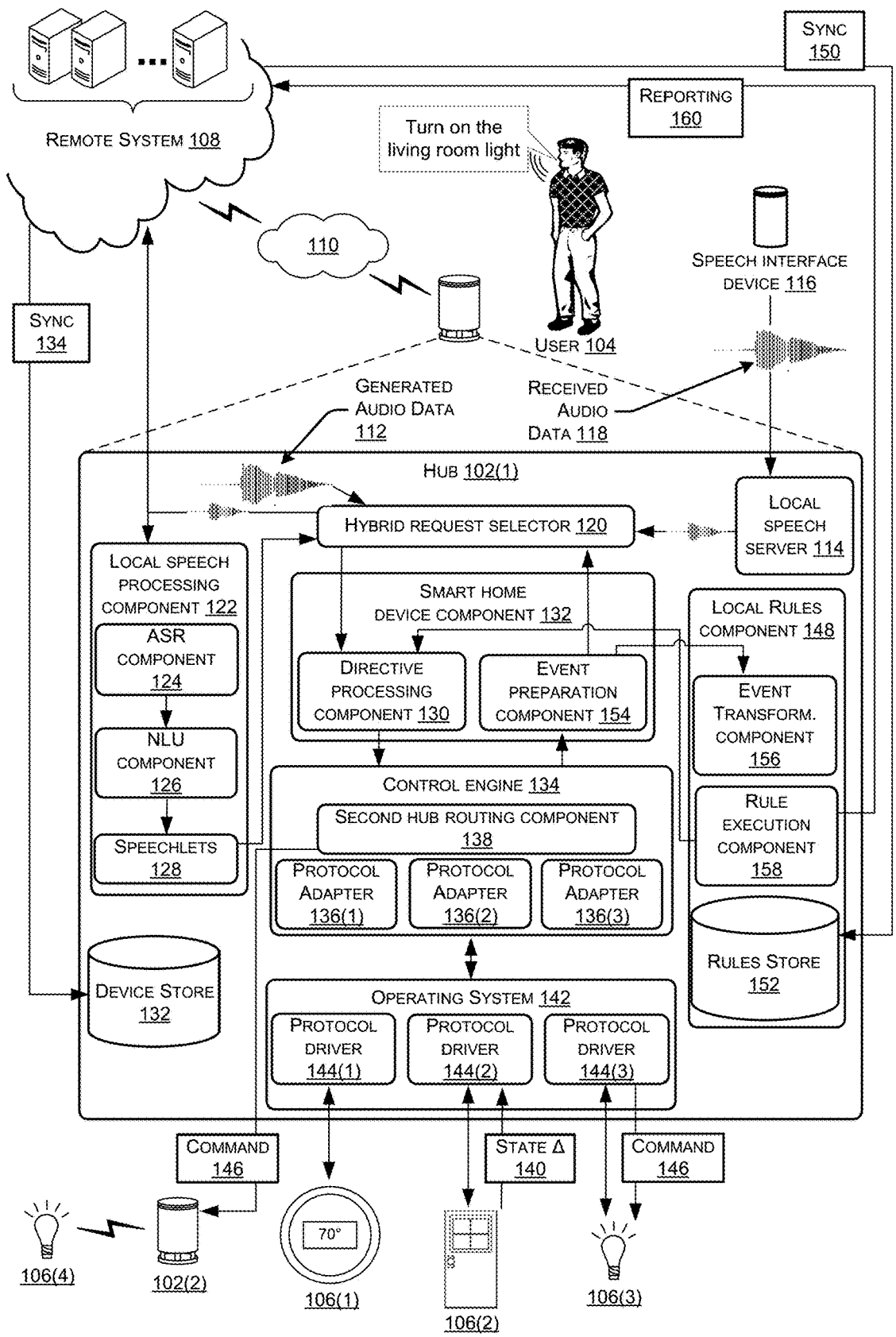
FIG. 1 is a block diagram illustrating a component architecture of a hub that is capable of controlling a second device while a connection to a remote system is unavailable.

Described herein are, among other things, techniques, devices, and systems for enabling voice control of a second device via a hub (e.g., a home automation hub), even in instances when a wide area network connection is unavailable to the hub. For instance, one or more second devices (e.g., home automation devices) may reside within an environment, along with one or more hubs that communicatively couple with the second devices and are configured to control the second devices. Under normal conditions, the hub is able to connect to a remote system over a wide area network so that the remote system can provide speech processing and control devices from the remote system. However, the hub described herein is also configured to process user speech and to generate directive data locally on the hub, without any assistance from the remote system. With this capability, the hub can provide a user with the ability to control second devices in the environment with his/her voice, even when the hub is unable to communicate with the remote system over a wide area network (e.g., the Internet).

In some embodiments, the hub is configured to act as a speech interface device by "listening" for utterances of a user in the environment of the hub. A hybrid request selector of the hub may determine whether audio data representing user speech is to be processed locally on the hub, and, if so, the hybrid request selector may provide the audio data as input to a local speech processing component executing on the hub. The local speech processing component may process the audio data to determine an intent, such as an intent to control a second device, and a name of the second device that the user wishes to control with a voice command. For example, a user may utter an expression that is understood as an intent to "turn on a light" in the environment, the light being an example of a second device. In the utterance, the user may reference the light with a friendly name, such as "living room light." The local speech processing component may determine the name of the second device, and may access a local device store—which is stored in the local memory of the hub—to determine an identifier of the second device corresponding to the determined name. With this identifier, the local speech processing component can generate a directive based on the intent, the directive including the identifier and an operation (e.g., "turn on") to be performed by the second device. The hub can then wirelessly send a command to the second device, directly or indirectly, instructing the operation to be performed at the second device.

Also described herein are techniques, devices, and systems for executing rules (e.g., "home automation rules") via a hub, even in instances when a wide area network connection is unavailable to the hub. Under normal conditions, the hub is able to connect to a remote system over a wide area network so that the remote system can provide rule execution to control second devices in the environment of the hub when the remote system determines that a rule is triggered. However, the hub described herein is also configured to execute rules locally on the hub. That is, the hub is configured to store rules in the local memory of the hub, to determine whether and when those rules are triggered, and to generate directive data locally on the hub, without any assistance from the remote system. With this additional capability, the hub can control a second device in the environment whenever locally-stored rule is triggered, even when the hub is unable to communicate with the remote system over a wide area network (e.g., the Internet).

In some embodiments, a user can create a rule using a companion application executing on a user device. For example, a user may create a rule to have the hub turn on an entry light when the front door is opened. In response to the creation of this rule, an orchestrator component, which may execute on a remote system, may determine whether the rule can be assigned to the hub as the owner of the rule's execution. This determination may be based at least in part on determining that the rule can be designated as a "locally-executable rule" in the sense that the condition for triggering the rule is detectable, and an operation specified in the rule is executable, by the hub, without any assistance from the remote system. Once a rule is assigned to the hub as the owner, the assigned rule can be synched to the hub over a wide area network. The hub may then monitor for triggering conditions for locally-executable rules synched to the hub (e.g., by monitoring events, voice commands, and/or the current time). In response to determining that a locally-executable rule is triggered, the hub can cause performance of the operation(s) specified in the rule, without any assistance from the remote system. For example, with respect to the example rule to turn on an entry light when the front door is opened, the hub may receive, from a sensor associated with the front door, an indication that the front door has been opened, which may trigger the rule to turn on an entry light. Thus, a locally-executable rule component of the hub may execute the rule by generating a directive to turn on an entry light, which may be identified by an identifier in the local device store that corresponds to the "entry light." In this example, the hub can wirelessly send a command to the second device, directly or indirectly, instructing the operation to be performed at the second device.

A hub, as described herein, can provide operability to control second devices in instances when the Internet is down, and/or when a remote system—that is relied upon under normal conditions to process speech and/or detect events for controlling second devices from the remote system—cannot otherwise be reached. Thus, when a storm causes the Internet to go down, a user may nevertheless be able to turn on a light in his/her house by uttering the expression "turn on the living room light" in the vicinity of the hub. When the Internet is down, the entry light may also turn on whenever the user walks in the front door, notwithstanding the fact that a connection to a remote system is unavailable to the hub.

FIG. 1 is a block diagram illustrating a component architecture of a hub 102(1) (e.g., a "home hub" 102(1), a "control hub" 102(1), etc.). The hub 102(1) may be local to and/or located within an environment, such as a home or other premises, to provide various capabilities to a user 104 in that environment. The hub 102(1) may be configured to connect a plurality of devices in an environment and control communications among them. The hub 102(1) may comprise a network device that serves as a place of convergence where data arrives from one or more devices, and from which data is sent to one or more devices.

Voice Control Modality: In an example, the hub 102(1) may be configured to operate as a speech interface device that is capable of capturing input audio representing user speech, and responding in various ways, such as by controlling second devices 106 that are collocated in the environment with the hub 102(1). FIG. 1 shows three example second devices 106 in the form of a thermostat 106(1), a door 106(2) (or a door lock), and a light 106(3). These are merely example second devices 106 provided for illustrative purposes, and it is to be appreciated that other types of second devices 106 can be controlled via the hub 102(1), such as, without limitation, lights, televisions, audio systems, doors, door locks, garage door openers, washing machines, dryers, dishwashers, coffee makers, refrigerators, automated window shades, tablets, telephones, or the like. That is, the second devices 106 may comprise any type of "home-automation" device configured to communicate wirelessly (and/or over a wired connection) with a controlling electronic device, such as the hub 102(1). Thus, a "second device 106" is a device that is different from the hub 102(1), and is collocated in a same environment as the hub 102(1).

The hub 102(1) may also be configured to execute rules (sometimes referred to as "automation rules") when the rules are triggered. The rules executed by the hub 102(1) may, in some instances, involve an action (or operation) performed by a device in the environment, such as one or more of the second devices 106.

Under normal conditions, the hub 102(1) may operate in conjunction with and/or under the control of a remote, network-based or network-accessible control system 108 (abbreviated to "remote system" 108 in FIG. 1). The remote system 108 may, in some instances be part of a network-accessible computing platform that is maintained and accessible via a wide area network 110. Network-accessible computing platforms such as this may be referred to using terms such as "on-demand computing", "software as a service (SaaS)", "platform computing", "network-accessible platform", "cloud services", "data centers", and so forth. The remote system 108 may be configured to provide particular functionality to large numbers of in-home devices of different users.

In some embodiments, the remote system 108 may be configured to receive audio data from the hub 102(1), to recognize speech in the received audio data using a remote speech processing component, and to perform functions in response to the recognized speech. In some embodiments, these functions involve the automated control, from the remote system, of one or more second devices 106 in the environment of the hub 102(1). Thus, under normal conditions, when the hub 102(1) is able to communicate with the remote system 108 over a wide area network 110 (e.g., the Internet), some or all of the functions capable of being performed by the remote system 108 may be performed by the remote system 108, independently of the hub 102(1), and/or performed by sending a directive over the wide area network 110 to the hub 102(1), which, in turn, may process the directive for controlling a second device(s) 106. For example, the remote system 108 may instruct the hub 102(1) to turn on a light 106(3) in the environment based on the remote system processing user speech to determine an intent to turn on the light. It is to be appreciated that the remote system 108 may be configured to provide other functions in addition to controlling second devices 106, such as, without limitation, playing music (e.g., by streaming music to the hub 102(1)), and/or outputting speech or other audio content, via the hub 102(1), conducting an electronic commerce transaction on behalf of the user 104 as part of a shopping function, and so on.

As described in more detail below with respect to the following figures, the hub 102(1) may include one or more microphones to capture utterances from a user, such as the user 104, in the environment of the hub 102(1). The hub 102(1) may generate audio data based at least in part on such utterances captured by the microphone(s) of the hub 102(1), which is shown as "generated audio data" 112 in FIG. 1. The hub 102(1) may, in some embodiments, further include a local speech server 114 that is configured to receive audio data from other devices in the environment, such as from a secondary speech interface devices 116 in the environment. The secondary speech interface device 116 shown in FIG. 1 may or may not operate as a hub, but it may nonetheless be configured to capture input audio representing user speech, and, under normal conditions, operate in conjunction with the remote system 108 to provide various functions described herein (e.g., music playback). However, in instances when the speech interface device 116 cannot communicate with the remote system 108 over the wide area network 110, the secondary speech interface device 116 may be configured to send audio data—which was captured by a microphone(s) of the secondary speech interface device 116—to the local speech server 114 of the hub 102(1). In this manner, the hub 102(1) can process audio data on behalf of secondary speech interface devices, such as the device 116, in the environment when the remote system 108 cannot be reached by those secondary speech interface devices, and possibly when the hub 102(1) also cannot reach the remote system 108. This type of audio data is shown in FIG. 1 as "received audio data 118."

Whether audio data is generated by the hub 102(1) as generated audio data 112 or received by the hub 102(1) as received audio data 118, the audio data 112/118 may be provided as input to a hybrid request selector 120 of the hub 102(1). The hybrid request selector 120 is configured to determine whether to have a remote speech processing component of the remote system 108 field an utterance, have a local speech processing component 122 of the hub 102(1) field the utterance, or have both local and remote speech processing components field the utterance. This determination can be made "on-the-fly," meaning that the hybrid request selector 120 of the hub 102(1) can determine where to send the audio data 112/118 in response to receiving the audio data 112/118 as input. Alternatively, the hybrid request selector 120 can make determination as to where to send the audio data 112/118 before receiving the audio data 112/118 (e.g., by diagnosing the hub's wide area network connectivity prior to receiving audio data as input).

When the hybrid request selector 120 sends the audio data 112/118 to the remote system 108 for processing speech remotely, the audio data 112/118 may be sent over the wide area network 110. The wide area network 110 is representative of any type of public or private, wide-area network, such as the Internet, which extends beyond the local premises (or environment) of the user 104 and/or the environment of the hub 102(1). Thus, the wide area network 110 may represent and/or include, without limitation, data and/or voice networks, a wired infrastructure (e.g., coaxial cable, fiber optic cable, etc.), a wireless infrastructure (e.g., radio frequencies (RF), cellular, satellite, etc.), and/or other connection technologies.

The local speech processing component 122 is configured to receive audio data 112/118 from the hybrid request selector 120 as input, to recognize speech in the audio data 112/118, to determine user intent from the recognized speech, and to determine how to act on the user intent. Depending on the nature of the recognized intent, the local speech processing component 122 may output a directive for controlling a second device 106. In some cases, a directive may include a description of the intent (e.g., an intent to turn on a light in the environment). In some cases, a directive may include (e.g., encode) an identifier of a second device 106, and an operation to be performed at the second device 106.

In some embodiments, the hub 102(1) may be configured to compare the audio data 112/118 to stored models used to detect a wakeword that indicates to the hub 102(1) that the audio data 112/118 is to be processed for determining an intent. In some embodiments, the hybrid request selector 120 may route the audio data 112/118 to the local speech processing component 122 to have the local speech processing component 122 determine whether a wakeword is detected in the audio data 112/118, and, if a wakeword is detected, this indication may be provided to the hybrid request selector 120 so that the hybrid request selector 120 can proceed to determine where to route the audio data 112/118 for speech processing, as described herein. If the local speech processing component 122 does not detect a wakeword in the audio data 112/118, this indication may be provided to the hybrid request selector 120 so that the hybrid request selector 120 can refrain from sending the audio data 112/118 out for further speech processing, which may include the hybrid request selector 120 discarding the audio data 112/118.

Among other logical and physical components, the local speech processing component 122 may include an automatic speech recognition (ASR) component 124 that is configured to perform ASR on the audio data 112/118 to convert the audio data 112/118 into ASR text data. ASR transcribes audio data into text data representing the words of the user speech contained in the audio data 112/118. A spoken utterance in the audio data can be input to the ASR component 124, which then interprets the utterance based on the similarity between the utterance and pre-established language models available to the local speech processing component 122. For example, the ASR component 124 may compare the input audio data 112/118 with models for sounds (e.g., subword units or phonemes) and sequences of sounds to identify words that match the sequence of sounds spoken in the utterance of the audio data 112/118. In some embodiments, the ASR component 124 outputs the most likely text recognized in the audio data 112/118, or multiple hypotheses in the form of a lattice or an N-best list with individual hypotheses corresponding to confidence scores or other scores (such as probability scores, etc.). In some embodiments, the ASR component 124 is customized to the user 104 (or multiple users) who created a user account to which the hub 102(1) is registered. For instance, the language models (and other data) used by the ASR component 124 may be based on known information (e.g., preferences) of the user 104, and/or on a history of previous interactions with the user 104.

The local speech processing component 122 may also include a natural language understanding (NLU) component 126 that performs NLU on the generated ASR text data to determine an intent so that directives may be determined based on the intent. Generally, the NLU component 126 takes textual input (such as processed from the ASR component 124) and attempts to make a semantic interpretation of the ASR text data. That is, the NLU component 126 determines the meaning behind the ASR text data based on the individual words, and then implements that meaning. The NLU component 126 interprets a text string to derive an intent or a desired action or operation from the user as well as the pertinent pieces of information in the text that allow for identifying a device (e.g., a second device 106) to complete that action or operation. For example, if a spoken utterance is processed using the ASR component 124, which outputs the ASR text "turn on the living room light" (as shown in FIG. 1) the NLU component 126 may determine that the user intended to have a light 106(3) named "living room light" turn on. The local speech processing component 122 may also provide a dialog management function to engage in speech dialogue with the user 104 to determine (e.g., clarify) user intents by asking the user 104 for information using speech prompts. In some embodiments, the NLU component 126 is customized to the user 104 (or multiple users) who created a user account to which the hub 102(1) is registered. For instance, data used by the NLU component 126 to understand the meaning of ASR text may be based on known information (e.g., preferences) of the user 104, and/or on a history of previous interactions with the user 104.

The local speech processing component 122 may also include, or be configured to use, one or more installed speechlets 128. Speechlets 128 may represent domains that are used in order to determine how to act on an utterance in a particular way, such as by outputting a directive that corresponds to the determined intent, and which can be processed to implement the desired operation. Accordingly, the term "speechlet" may be used interchangeably with the term "domain" or "domain implementation." The speechlets 128 installed on the hub 102(1) may include, without limitation, a music speechlet 128 (or music domain) to act an utterances with intents to play music on a device, such as via a speaker(s) of the hub 102(1), a shopping speechlet 128 (or shopping domain) to act on utterances with intents to buy an item from an electronic marketplace, and/or a device control speechlet 128 (or device control domain) to act on utterances with intents to control a second device(s) 106 in the environment. Such a device control speechlet 128 may be a home automation speechlet 128 (or a home automation domain).

In an instance where the NLU component 126 determines an intent (e.g., an intent to "turn on a light") that is to be routed to a domain/speechlet 128, the NLU component 126 may further identify portions of the ASR text data that correspond to a named entity that may be recognizable to the local speech processing component 122 as a second device 106 that is to be controlled. Named entity resolution may utilize a gazetteer, or similar information, to determine a name of a second device 106 in the ASR text. In an example, the user 104 may reference "living room light" in a spoken utterance, which may be resolved to a recognized name (or named entity) by the NLU component 126.

Under normal conditions—when a wide area network connection is available to the hub 102(1)—the hybrid request selector 120 of the hub 102(1) may send audio data 112/118 to the remote system 108 for speech processing, and may receive, from the remote system 108, a directive to control a second device 106. However, in conditions where the hybrid request selector 120 of the hub 102(1) provides the audio data 112/118 as input to the local speech processing component 122, a domain/speechlet 128 of the local speech processing component 122 may generate, as output, directive data that is formatted in a same, or a similar, format used by the remote speech processing component of the remote system 108. Thus, when a directive, such as a directive for controlling a second device 106, is generated by the local speech processing component 122, the directive can be processed by downstream components of the hub 102(1) in the same way that a directive received from the remote system 108 would be processed. Thus, the downstream components of the hub 102(1) may be unaware of the fact that the hub 102(1) may be processing speech locally (e.g., when the Internet is down) because directives generated by the local speech processing component 122 may be formatted in the same or similar way that remotely-generated directives are formatted, which makes the local speech processing "transparent" to the downstream components of the hub 102(1) that process directives, such as directives for controlling second devices 106.

In an example, directive data that is generated by the domain/speechlet 128 of the local speech processing component 122 (also referred to as a "locally-generated directive") may be formatted using Java, such as JavaScript syntax, or JavaScript-based syntax. This may include formatting the locally-generated directive using JavaScript Object Notation (JSON). In some embodiments, such a locally-generated directive may be serialized, much like how remotely-generated directives are serialized for transmission in data packets over the wide area network 110. In other embodiments, a locally-generated directive is formatted as a programmatic application programming interface (API) call with a same logical operation as a remotely-generated directive. In other words, a locally-generated directive may mimic remotely-generated directives by using a same, or a similar, format as the remotely-generated directive. In this manner, downstream components of the hub 102(1), such as a directive processing component 130, is able to process a directive without concern as to where the directive was generated (i.e., locally or remotely). This also allows for leveraging existing hub components that are used in online-capable hubs without requiring a complete redesign of these downstream components.

An example structure of a locally-generated directive may include a header object, an endpoint object, and a payload object. The header object may include a set of fields that provide different types of identifying information (sometimes called "properties"). Header properties may include, without limitation, a namespace (e.g., for specifying a category for the message payload, e.g., "power controller," thermostat controller," etc.), a name (e.g., TurnOn or TurnOff), a message identifier (ID) (e.g., a unique identifier for a single request or response), a correlation token (e.g., to identify a directive, and possibly events associated therewith), a payload version (e.g., version of the capability interface applied to the message). The endpoint object may identify a target for a directive, and possibly an origin of an event. An endpoint, in this context, can represent a physical device, a virtual device, a group of devices, a software component. The endpoint may include an authentication token to enable communication with a device(s) or component represented by the endpoint. Endpoint properties may include, without limitation, a scope (e.g., a polymorphic object that provides authorization and identifying information for a message, and may include a token that identifies a user), an endpoint ID (e.g., a unique identifier corresponding to the endpoint), and a cookie (e.g., a list of key/value pairs associated with the endpoint).

FIG. 1 shows that a local copy of a device store 132 may be stored in the local memory of the hub 102(1). An authoritative device store may be mastered at the remote system 108, and may include information about devices, such as hubs 102(1), secondary speech interface devices 116, and second devices 106 that are registered to a user account of the user 104 (or of multiple users). This authoritative device store that is maintained at the remote system 108 can be synched 134 from remote system 108 at any suitable time, such as upon power up of hub 102(1), periodically (e.g., daily, hourly, etc.), and/or at any other suitable time. In some embodiments, the hub 102(1) and the remote system 108 may be configured to periodically compare data (e.g., by sending hashes back and forth) to see if the local copy of the device store 132 is up-to-date (e.g., by determining whether any additional information is included in the authoritative device store). In some embodiments, when changes occur with respect to the authoritative device store, (e.g., when a device(s) is added or removed from a user account, when names or identifiers of registered devices change, etc.), the remote system 108 may sync 134 the device registries by pushing an updated copy of the device store 132 (either the entire device store 132 or just the different information) to the hub 102(1) that is registered to the user account of the user 104.

In operation of the hub 102(1), such as when the user 104 issues a voice command to control a second device 106, the device store 132 may be accessed (e.g., by the smart home device component 132) in order to determine a device identifier (e.g., a Media Access Control (MAC) address, an Internet Protocol (IP) address, etc.) of a second device 106 that corresponds (e.g., maps) to a name (e.g., "living room light") recognized by the NLU component 126 of the local speech processing component 122. The identifier obtained (or retrieved) from the device store 132 may be encoded in the directive data that is generated by the local speech processing component 122 and used by downstream components of the hub 102(1) to locate and/or send data to the second device 106 identified by the identifier.

Accordingly, the directive that is generated by the local speech processing component 122 may be returned to the hybrid request selector 120, and the hybrid request selector 120 may determine whether to forward the locally-generated directive to downstream components, or to discard the locally-generated directive in favor of a remotely-generated directive that may have been received from the remote system 108. For example, in a scenario where the hybrid request selector 120 sends the audio data 112/118 to the remote system 108 for speech processing in parallel with (or in addition to) providing the audio data 112/118 as input to the local speech processing component 122, the hybrid request selector 120 may, in some instances, receive a remotely-generated directive from the remote system 108, and may favor using the remotely-generated directive in lieu of the locally-generated directive. This preference for remotely-generated directives, when available, may be based on the notion that local ASR and NLU may match the level of performance achievable by remote ASR and NLU components, which are often less-resource-constrained at the remote system 108. For example, the hub 102(1) is likely to have constrained resources (e.g., processing resources, memory resources, etc.) as compared to the computing resources available to the remote system 108. Thus, the level of quality provided by local speech processing may be lower than the quality level achievable by remote speech processing systems.

In any case, the hybrid request selector 120 may forward a directive, such as a directive to control a second device 106, to the directive processing component 130 of smart home device component 132. Event preparation functionality of the smart home device component 132 will be discussed in further detail below. The directive processing component 130 may be configured to translate the directive received from the hybrid request selector 120 into a language that is understood (or able to be processed) by a control engine 134. The translated directive may be in the form of a command that specifies an object known to the control engine 134, the object corresponding to the second devices 106 that is to be controlled. The control engine 134 may track second devices 106 as objects that are communicatively coupled to the hub 102(1), and other second devices 106 as objects that are communicatively coupled to other hubs in the environment, and information about these objects may be provided to the smart home devices component 132 for use in identifying objects corresponding to the second devices 106 to be controlled, and in translating directives into commands that specify those identified objects. The directive processing component 130 may also be configured to incorporate the operation to be performed at the second device 106 into the translated directive that is communicated to the control engine 134.

The control engine 134 may represent an instance of the control engine 134 that is implemented at the hub 102(1), and other instances of the control engine 134 may be implemented at other hubs in the environment to provide interoperability between pairs of hubs 102(1) and routing of translated directives (or commands) between hubs 102(1).

The control engine 134 may be associated with one or more protocols (e.g., IoT protocols and other wireless communication protocols). As such, the control engine 134 may include multiple protocol adapters 136, each enabling the hub 102(1) to communicate via a respective protocol. FIG. 1 shows three protocol adapters 136(1)-(3), but it is to be appreciated that a lesser or greater number of protocol adapters may be included in the control engine 134. The protocol adapters 136 may be associated with protocols including, without limitation, Transmission Control Protocol/Internet Protocol (TCP/IP) protocol, Bluetooth® protocol, Bluetooth Low Energy (BLE) protocol, ZigBee® protocol, Z-wave® protocol, WiFi protocol, and/or any other type of protocol usable to communicate wirelessly between electronic devices in an environment, including those that do not rely data transmission over the wide area network 110. As such, the hub 102(1) may be configured with one or more respective protocol stacks (e.g., a protocol stack corresponding to BLE), and the corresponding protocol adapters 136 allow the hub 102(1) to communicate with a second device 106 via the corresponding protocol (e.g., BLE). As illustrated, the hub 102(1) may be configured to communicate with a first second device 106(1) (e.g., a thermostat) via the protocol corresponding to the protocol adapter 136(1), to communicate with an additional second device 106(2) (e.g., a door, a door lock, etc.) via the protocol corresponding to the protocol adapter 136(2), and to communicate with a third second device 106(3) (e.g., a light) via the protocol corresponding to the protocol adapter 136(3). That is, the hub 102(1) may be responsible for controlling the second devices 106(1)-(3), and may communicate with these second devices 106(1)-(3) via the protocols supported by the protocols stacks/protocol adapters 136(1)-(3). It is to be appreciated that, although three different second devices 106(1)-(3) are shown in FIG. 1 as communicating over three different protocols, different second devices 106 can nevertheless communicate over a common protocol such that a single protocol adapter 136(1) may be used to control different second devices 106 that are capable of communicating using the protocol corresponding to the protocol adapter 136(1).

The secondary hub 102(2) may be responsible for controlling a fourth second device 106(4) because the secondary hub 102(2) may be in communication range of the fourth second device 106(4), whereas the hub 102(1) may not be in communication range of the fourth second device 106(4). Accordingly, the control engine 134 of the hub 102(1) may include a secondary hub routing component 138 to communicate with this secondary hub 102(2), and other secondary hubs in the environment.

As mentioned, the control engine 134 may keep track of devices, such as second devices 106, in the environment that are registered to a user account to which the hub 102(1) is also registered. The control engine may also track owners (e.g., hubs) of second devices 106, these owners claiming responsibility for controlling a particular second device 106, or group of second devices 106. This information may be shared between hubs in the environment and with the remote system 108. The control engine 134 may also keep track of a current state of individual second devices 106. State may include binary states (e.g., whether a light is on or off, whether a lock is locked or unlocked, whether a garage door is open or closed) and non-binary states (e.g., a current brightness level of a television, a current color of a smart light bulb, a time at which a coffee maker is set to turn on, etc.). When a state of a second device 106 is successfully changed, a state change 140 may be sent from the second device 106 to the hub 102(2), and the control engine 134 may share this state change 140 information with other hubs and/or with the remote system 108 to keep current state information up-to-date at those devices.

An operating system 142 of the hub 102 may include, among other operating system components and logic, protocol drivers 144 for interfacing with the second devices 106 in the environment. These protocol drivers 142, and perhaps other action/operation handlers or interfaces, may be used to send commands 146, via a wireless protocol, to second devices 146 that are to perform an operation (or action) specified in the command 146.

Figure 2:
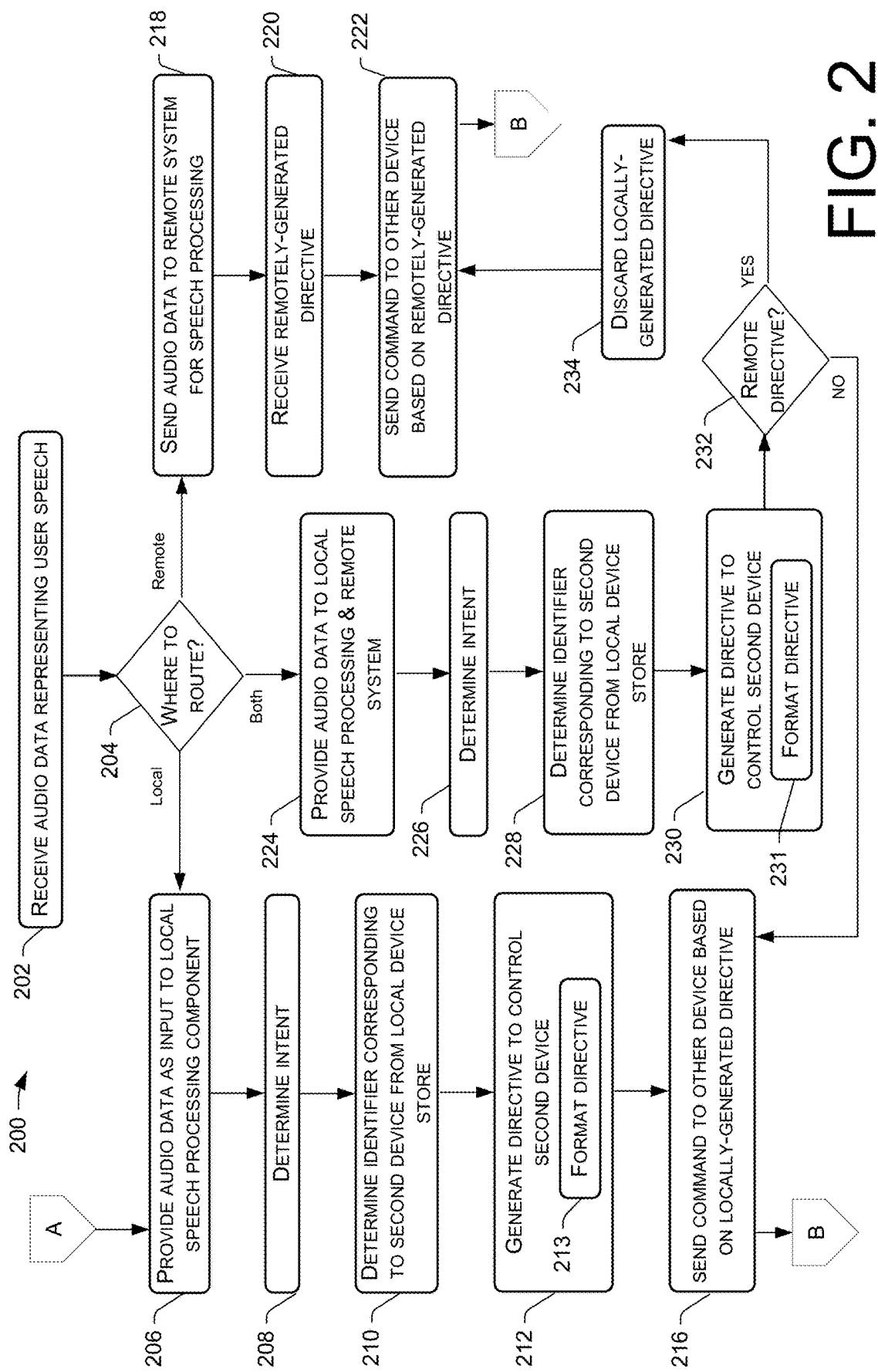
FIG. 2 is a flow diagram of an example process for enabling voice control of second devices via a hub while a connection to a remote system is unavailable.

Turning briefly to FIG. 2, an example process to be implemented by the hub 102(1) of FIG. 1 will be described. The processes described herein are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 2 is a flow diagram of an example process 200 for enabling voice control of second devices 106 via a hub 102(1) while a connection to a remote system is unavailable. For discussion purposes, the process 200 is described with reference to the previous figure.

At 202, a hub 102(1) may receive audio data 112/118 that represents user speech. The audio data 112/118 may be received by the hub 102(1) as the generated audio data 112 (i.e., received after generating the audio data 112 via its own microphones), or the audio data 112/118 may be received from another speech interface device 116 at block 202. In an example, a user 104 may have uttered the expression "turn on the living room light," as depicted in FIG. 1.

At 204, the hybrid request selector 120 may receive the audio data 112/118 as input and may determine where to route the audio data 112/118. For example, the determination at block 204 may be a determination to route the audio data 112/118 to a local speech processing component 122 of the hub 102(1), to a remote speech processing component of the remote system 108, or to both local and remote speech processing components. In some embodiments, the determination at block 204 is made after (e.g., in response to) generating or receiving the audio data 112/118 at block 202, but the determination at block 204 may alternatively be made before the audio data 112/118 is generated or received at block 202. In some embodiments, the determination at block 204 may be based at least in part on a determination as to whether a remote system 108 configured to process speech is available or unavailable to the hub 102(1). For example, if the hybrid request selector 120 determines that a remote system 108 configured to process speech is unavailable to the hub 102(1), the determination at block 204 may be to route the audio data 112/118 to the local speech processing component 122 or both the local speech processing component 122 and the remote system 108.

At 206, if the hybrid request selector 120 determined to exclusively route the audio data 112/118 to the local speech processing component 122 of the hub 102(1), without also routing the audio data 112/118 to the remote system 108, the hybrid request selector 120 may input the audio data 112/118 to a local speech processing component 122 executing on the hub 102(1).

At 208, the local speech processing component 122 may determine, based at least in part on processing the audio data 112/118, intent data (e.g., the intent data representing an intent to "turn on a light"). It is to be appreciated that "intent data" may sometimes be referred to herein as "intent", and that references to "intent" are often meant as "intent data." The intent may be determined at block 208 by processing the audio data 112/118 using ASR and NLU. For example, the local speech processing component 122 may perform ASR on the audio data 112/118 to generate ASR text data corresponding to the audio data 112/118, and may perform NLU on the ASR text data to determine the intent, and to determine that the intent is associated with a particular domain/speechlet 128, such as a domain/speechlet 128. In some embodiments, the local speech processing component 122 may also determine text data representing a name of a second device 106 (e.g., "the living room light") referenced in the user's speech. The name of the second device 106 may be determined at block 208 by performing NLU on the ASR text data.

At 210, the local speech processing component 122 (or perhaps another component of the hub 102(1)) may further determine an identifier of a second device 106 that is collocated in an environment with the hub 102(1), and is to be controlled according to the intent. If the user 104 explicitly uttered a name of the second device 106 (or a group of second devices 106, e.g., the "kitchen lights") to be controlled, the identifier(s) may be determined as an identifier(s) corresponding to the name uttered by the user 104. In cases where the user 104 does not mention a particular name of a second device, the local speech processing component 122 may resolve an identity of a second device that is to be controlled in other ways. For example, an identifier(s) of a second device 106 to be controlled may be determined from context information, in the absence of the user 104 explicitly specifying a name of a second device 106 (or a name of a group). The context information can include knowledge of where a "spoken-to" device is located within an environment. For instance, if the user 104 utters the expression "turn on the lights" to a speech interface device 116 that is known (from the information in the device store 132) to be located in a kitchen of the user's 104 house, the hub 102(1) (which may receive the audio data 118 from the speech interface device 116 in the kitchen) may determine, at block 210, that the location of the speech interface device 116 is the kitchen, may determine which lights are in the kitchen, and may determine identifiers of the lights that are in the kitchen. This may be achievable due to the definition of groups and spaces within the device store 132 that allow the hub 102(1) to determine which second device(s) 106 the user 104 wishes to control with a voice command that does not name a specific device 106 or group of devices 106.

In any case, the identifier of a second device 106 may be determined at block 210 by accessing a device store 132 stored in local memory of the hub 102(1). For example, the local speech processing component 122 may lookup an identifier in the device store 132 (e.g., using the name of the second device 106 that may have been determined at block 208). The device store 132 may have, at some point in time prior to performance of the operations at block 202, been received over a wide area network 110 from a remote server computer of the remote system 108, and may have been mastered at the remote system 108. The device store 132 may include information that was synched 134 to the hub 102, the information including identifiers and friendly names of second devices 106 that are registered to a user account to which the hub 102(1) is also registered.

At 212, the local speech processing component 122 may generate, as output, directive data based at least in part on the intent data determined at block 208. The directive data generated at block 212 may also be based on the domain/speechlet 128 to which the intent was routed (e.g., a domain/speechlet 128). It is to be appreciated that "directive data" may sometimes be referred to herein as "directive", and that references to "directive" are often meant as "directive data." The directive data generated at block 212 may include (e.g., encode) the identifier of the second device 106 that was determined at block 210. The directive generated at block 212 may further include an operation to be performed at the second device 106(1) (e.g., a "turn on" operation). As shown at sub-block 213, the directive generated at block 212 may be generated in a same, or a similar, format used by a remote speech processing component to generate directives that are sent from the remote speech processing component to the hub 102(1). For example, the directive may be formatted using JavaScript (e.g., JSON). It is to be appreciated that a single utterance may cause multiple directives to be generated at block 212, such as when the user names (or otherwise desires to control) a group of second devices 106.

At 216, a control engine 134 of the hub 102(1) (perhaps in coordination with one or more other components of the hub 102(1), such as a protocol adapter 136, a protocol driver 144, and an antenna) may send a command 146 (e.g., via a wireless protocol) to a device in the environment. Prior to sending the command at block 216, the directive processing component 130 may translate the directive generated at block 212 into the command 134, which may represent a control message that is in a language that is understood (or able to be processed) by the control engine 134. In some embodiments, the command 146 may specify an object corresponding to the second device 106 that is to be controlled. The command 146 may instruct the operation specified in the directive to be performed at the second device 106 (e.g., to turn on the living room light 106(3)). The device that receives the command 146 from the hub 102(1) may be the second device 106 at which the operation is to be performed, or the device may be an intermediate device, such as a secondary hub 102(2) that is within wireless communication range of the second device 106. Thus, the command 146 may be sent directly from the hub 102(1) to the second device 106, or indirectly to the second device 106 via an intermediate, secondary hub 102(2). In either case, the wireless transmission of the command 146 from the hub 102(1) to the second device 106 does not involve transmitting the command 146 over the wide area network 110. For instance, BLE protocol, Zigbee protocol, WiFi protocol (over a local area network), or another IoT protocol may be utilized at block 216. It is to be appreciated that the control engine 134 may receive multiple different directives to control multiple different devices 106 based on a single utterance (e.g., when the user 104 wishes to control a group of second devices 106). The control engine 106 may be configured to determine, for each directive, where to route the directive (e.g., to a different hub 102 in the environment that is within range of a particular second device 106), directly to another of the second devices 106, which protocol to utilize, and the like. Thus, although a single directive is predominantly described herein for the example techniques, the hub 102(1) is nevertheless capable of handling a plurality of directives.

If, at block 204, the hybrid request selector 120 determined to exclusively route the audio data 112/118 to the remote speech processing component of the remote system 108, without also routing the audio data 112/118 to the hub 102(1), the hybrid request selector 120 may, at block 218, send, over the wide area network 110, the audio data 112/118 to a remote speech processing component executing on one or more remote server computers of the remote system 108.

At 220, the hybrid request selector 120 may receive a remotely-generated directive (e.g., within the predetermined period of time).

At 222, the control engine 134 of the hub 102(1) (perhaps in coordination with one or more other components of the hub 102(1), such as a protocol adapter 136, a protocol driver 144, and an antenna) may send a command 146 (e.g., via a wireless protocol) to a device in the environment utilizing the remotely-generated directive.

FIG. 2 also illustrates that, in at least some embodiments, the hybrid request selector 120 may route the audio data 112/118 to both the remote system 108 and the local speech processing component 122, in parallel (e.g., contemporaneously or at different times). In this case, the hybrid request selector 120, at block 224, may input the audio data 112/118 to a local speech processing component 122 executing on the hub 102(1), and may also send, over the wide area network 110, the audio data 112/118 to a remote speech processing component executing on one or more remote server computers of the remote system 108.

At 226, the local speech processing component 122 may determine, based at least in part on processing the audio data 112/118, intent data. The operation(s) performed at block 226 may be similar to the operation(s) described with reference to block 208.

At 228, the local speech processing component 122 (or perhaps another component of the hub 102(1)) may further determine an identifier of a second device 106 that is collocated in an environment with the hub 102(1), and is to be controlled according to the intent. The operation(s) performed at block 228 may be similar to the operation(s) described with reference to block 210.

At 230, the local speech processing component 122 may generate, as output, directive data based at least in part on the intent data determined at block 226. The operation(s) performed at block 230 may be similar to the operation(s) described with reference to block 212. For example, at sub-block 231, the directive generated at block 230 may be generated in a same, or a similar, format used by a remote speech processing component to generate directives that are sent from the remote speech processing component to the hub 102(1).

At 232, the hybrid request selector 120 (in receipt of the locally-generated directive) may determine whether a remotely-generated directive was received from the remote system 108. If no remotely-generated directive was received at block 232, the process 200 may follow the "no" route from block 232 to block 216 to send the command based on the locally-generated directive. This may be based on the assumption that a wide area network connection is unavailable to the hub 102(1) if a response is not received from the remote system 108, without formally diagnosing the availability of the connection. In some embodiments, the hybrid request selector 120 is configured to wait a predetermined period of time for a response from the remote system 108, and if, after the period of time, a response is not received at block 232, the process 200 may proceed directly to block 216 by effectively aborting the remote system-based process.

If, on the other hand, the hybrid request selector 120 received a remotely-generated directive at block 232, the process 200 may follow the "yes" route from block 232 to block 234. At 234, the hybrid request selector 120 may discard the locally-generated directive that was generated at block 230 by the local speech processing component 122, the discarding based at least in part on the receiving of the remotely-generated directive from the remote system 108. In this scenario, the control engine 134 can send the command at block 222 using the remotely-generated directive to control the second device 106.

Figure 3:
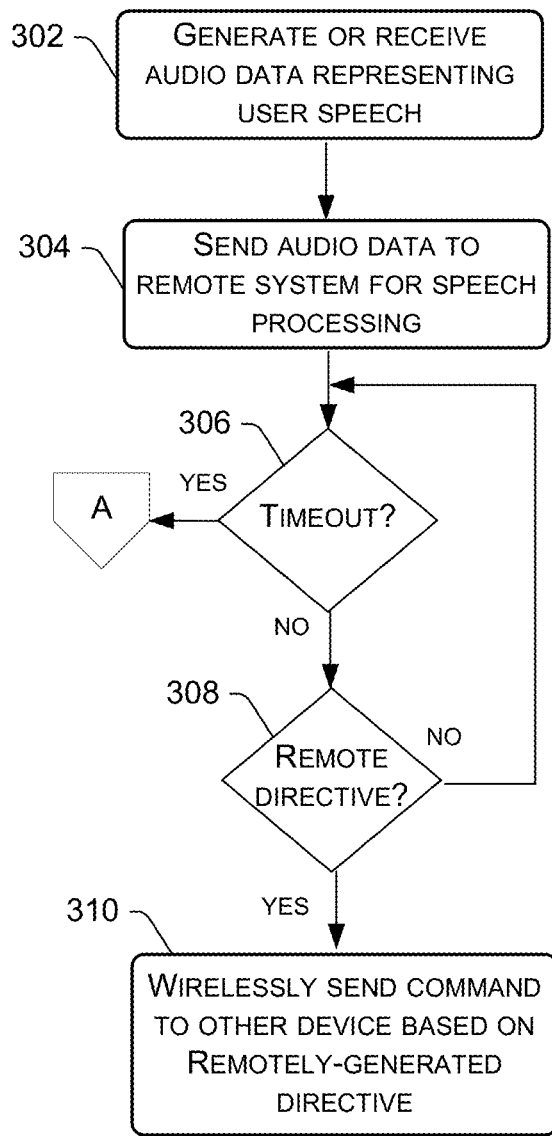
FIG. 3 is a flow diagram of another example process for enabling voice control of second devices via a hub while a connection to a remote system is unavailable.

FIG. 3 is a flow diagram of another example process 300 for enabling voice control of second devices 106 via a hub 102(1) while a connection to a remote system is unavailable. For discussion purposes, the process 300 is described with reference to the previous figures.

At 302, a hub 102(1) may generate or receive audio data 112/118 that represents user speech.

At 304, the hybrid request selector 120 may receive the audio data 112/118 as input, and may send, over a wide area network 110, the audio data 112/118 to a remote speech processing component executing on one or more remote server computers of the remote system 108. In some embodiments, the operation(s) performed at block 304 may be similar to the operation(s) described with reference to block 208 of the process 200 of FIG. 2. In some embodiments, the blocks 306-310 may represent a sub-process of the process 200 shown in FIG. 2 after performance of block 208.

At 306, the hybrid request selector 120 may initiate a timer after sending the audio data 112/118 at block 304, and may monitor for a lapse of a set period of time while waiting for a response from the remote system 108. If the period of time has not yet lapsed at block 306, the hybrid request selector 120 may follow the "no" route from block 306 to block 308.

At 308, the hybrid request selector 120 may determine whether a response (e.g., a remotely-generated directive, a notification that the audio data 112/118 was processed and a directive was sent to another device, etc.) was received from the remote system 108. If no response was received at block 308, the process 300 may follow the "no" route from block 308 back to block 306 where the lapse of the period of time is again monitored. If a timeout has not yet occurred, the process 300 may iterate to block 308, and if a remotely-generated directive is received at block 308 before a timeout occurs, the process 300 may follow the "yes" route from block 308 to block 310.

At 310, a control engine 134 of the hub 102(1) (perhaps in coordination with one or more other components of the hub 102(1), such as a protocol adapter 136, a protocol driver 144, and an antenna) may send a command 146 via a wireless protocol to a device in the environment, which may be similar to block 216 of the process 200 when a remotely-generated directive is utilized for the command 146.

Returning to block 306, if, in the alternative, a timeout (e.g., a lapse of the set period of time) occurs without receiving a response from the remote system 108 at the hub, the process 300 may follow the "yes" route from block 306 to block 206 of the process 200, as shown by the off-page reference "A" in FIGS. 2 and 3. In other words, the process 300 of FIG. 3 illustrates an embodiment where a wide area network connectivity determination is made after generating or receiving the audio data 112/118 by inferring that the hub 102(1) does not have connectivity in instances where the hub 102(1) fails to receive a response within a set period of time, and the hub 102(1) may first attempt to send audio data 112/118 to the remote system 108, and, if unsuccessful in that attempt, the hybrid request selector 120 may thereafter provide the audio data 112/118 as input to the local speech processing component 122. It is to be appreciated that, in the example process 300 of FIG. 3, when a remotely-generated directive is received at block 308 before a timeout, the hybrid request selector 120 may refrain from providing the audio data 112/118 as input to the local speech processing component 122 altogether.

Figure 4:
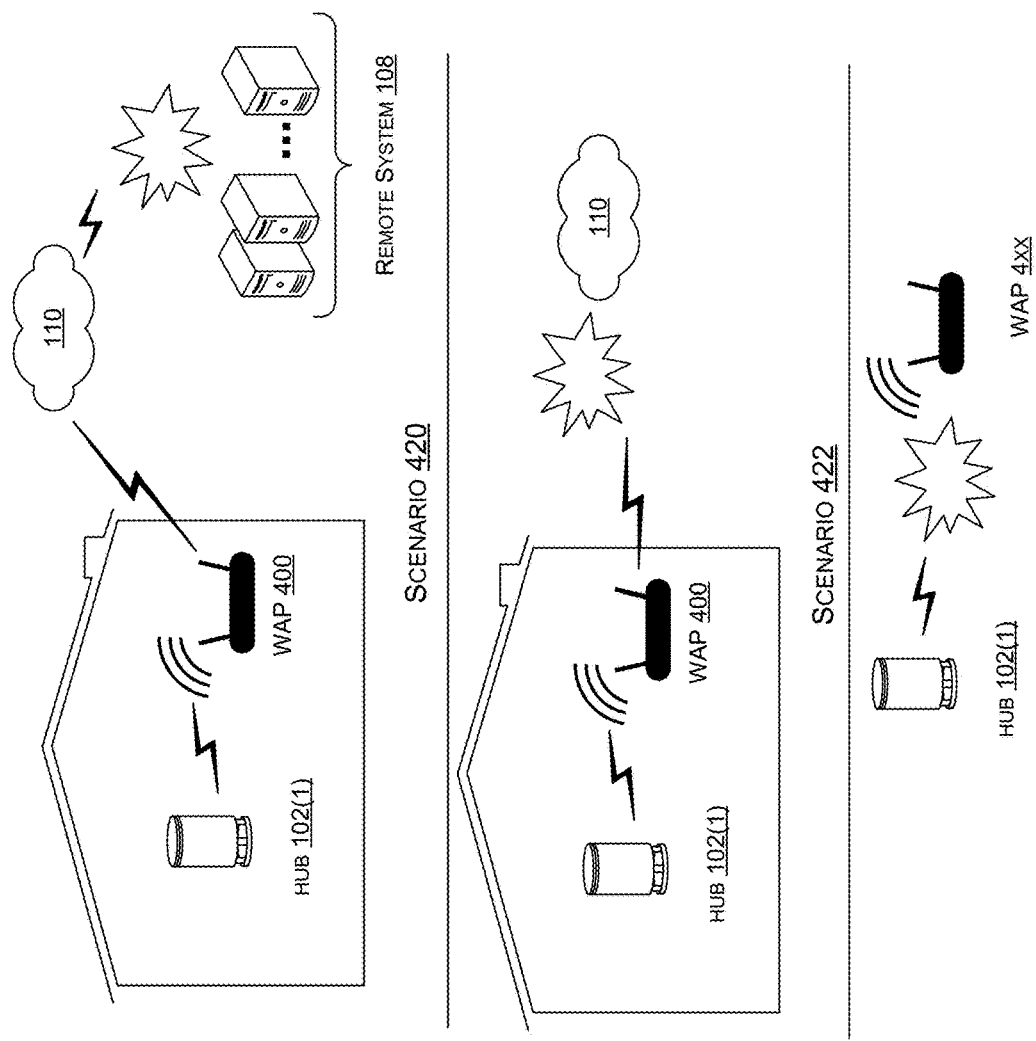
FIG. 4 is a flow diagram of an example process for determining where to route speech based on a diagnosis of wide area network connectivity for a hub.
Figure 4:
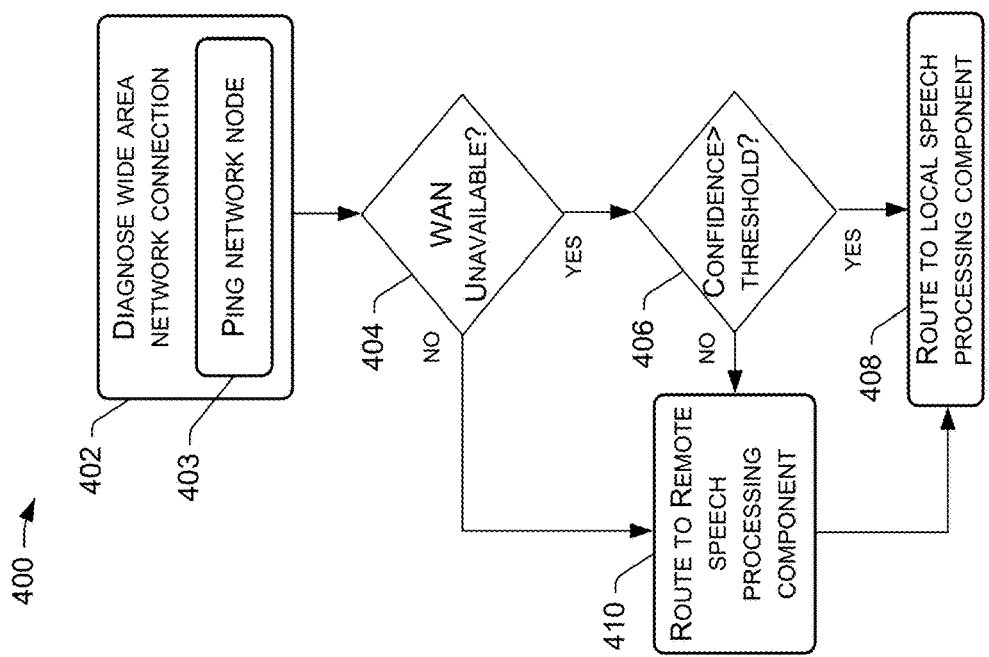

FIG. 4 is a flow diagram of an example process 400 for determining where to route speech based on a diagnosis of wide area network connectivity for a hub 102(1). For discussion purposes, the process 400 is described with reference to the previous figures. FIG. 4 may represent a sub-process of the process 200 of FIG. 2, and in particular, a sub-process of block 204 where an up-front routing determination for audio data 112/118 is made.

At 402, the hybrid request selector 120 may determine (perhaps with assistance from other components of the hub 102(1), such as an antenna(s)) whether a wide area network connection is unavailable to the hub 102(1). This may be done by performing some sort of diagnostic test at block 402 before or after generating or receiving audio data 112/118 at the hub 102(1) representing user speech. Additionally, or alternatively, this may be done during a speech processing operation, such as by performing the process 300 of FIG. 3, where the determination is based on an inference from an informal diagnostic test, rather than a formal diagnostic test.

As shown by sub-block 403, the diagnostic determination at block 402 may include the hub 102(1) pinging (e.g., on a periodic basis, and/or in response to generating or receiving audio data 112/118 at the hub 102(1)) the remote system 108 for a response. The "pinging" may be performed by sending arbitrary test data, or by sending actual audio data 112/118 that represents user speech. If a response to a (most recent) ping is received within a threshold period of time, a determination at block 404 may be that a remote system 108 configured to process speech is available to the hub 102(1). Otherwise, if a response to a (most recent) ping is not received within a threshold period of time, a determination at block 404 may be that a remote system 108 configured to process speech is unavailable. A determination that a remote system 108 is unavailable may also be characterized as a determination that a wide area network connection to the remote system 108 is slow (e.g., a response to the ping is not received within a threshold period of time). Thus, "unavailable" in this context may, in some instances, mean that a network connection is slow.

The determination at block 404 can be challenging to make at a satisfactory level of confidence. For instance, as shown by scenario 420 in FIG. 4, a local area network (e.g., a local WiFi network) may appear to be operating properly because the hub 102 may be able to communicate with a wireless access point 400 in the environment, and may be able to communicate with some remote systems (e.g., third party web servers) over the wide area network 110, and a broadband connection available to the hub 102 may be otherwise functioning properly. However, scenario 420, the hub 102 may nevertheless be unable to communicate with the remote system 108 that provides speech processing and device control functions.

Alternatively, as shown by scenario 422 of FIG. 4, a connection with a wireless access point 400 may be healthy, but no remote systems can be reached via the wide area network 110, including the remote system 108. In this scenario, the hub 102(1) may be more confident that a wide area network connection is unavailable to the hub 102(1).

Alternatively, as shown by scenario 424 of FIG. 4, a connection with a wireless access point 400 is unavailable. In this scenario, the hub 102(1) may be even more confident that a wide area network connection is unavailable to the hub 102(1).

Other scenarios than those depicted in FIG. 4 may indicate to the hub 102(1) that a wide area network connection is unavailable to the hub 102(1). In these, or other, scenarios where there appears to be some difficulty in contacting the remote system, the process 400 may follow the "yes" route from block 404 to block 406.

At block 406, a determination may be made as to whether the apparent unavailability of the wide area connection can be made at a confidence level that is above a threshold confidence (e.g., at least 90% certainty). For example, the hub 102(1) may be configured to assign a confidence score to the unavailable wide area network connection determination based on particular criteria being met. Using the illustrated scenarios in FIG. 4, a relatively low confidence score may be assigned to the "yes" determination at block 404 if the hub 102(1) can communicate over the wide area network 110 with some, but not all, remote systems, as shown in scenario 420. An intermediate confidence score may be assigned to the "yes" determination at block 404 if the hub 102(1) can communicate with the wireless access point 400, but not any remote systems over the wide area network 110, as shown in scenario 422. Finally, a relatively high confidence score may be assigned to the "yes" determination at block 404 if the hub 102(1) cannot even communicate with the wireless access point 400 in the environment.

Accordingly, if the confidence is above a threshold confidence level/score at block 406, the hub 102(1) may be assume, with a satisfactory level of confidence, that the remote system 108 cannot be reached, and the process 400 may follow the "yes" route from block 406 to block 408 where the hybrid request selector 120 may route audio data 112/118 to the local speech processing component 122. In this case, the hybrid request selector 120 may conserve resources by refraining from attempting to send the audio data 112/118 to the remote system 108.

Otherwise, if either the determination at block 404 is that the wide area network connection might be available, or the determination at block 406 is that the hub 102(1) cannot be sure (to a satisfactory level of confidence) that the wide area network connection is unavailable, the process 400 may follow either the "no" route from block 404, or the "no" route from block 406 to block 410, where the hybrid request selector 120 may route the audio data 112/118 to the remote system 108 for speech processing at the remote system 108. As shown in FIG. 4 by the arrow from block 410 to block 408, this remote routing of audio data 112/118 may be performed in parallel with (or in addition to) routing the audio data 112/118 to the local speech processing component.

Figure 5:
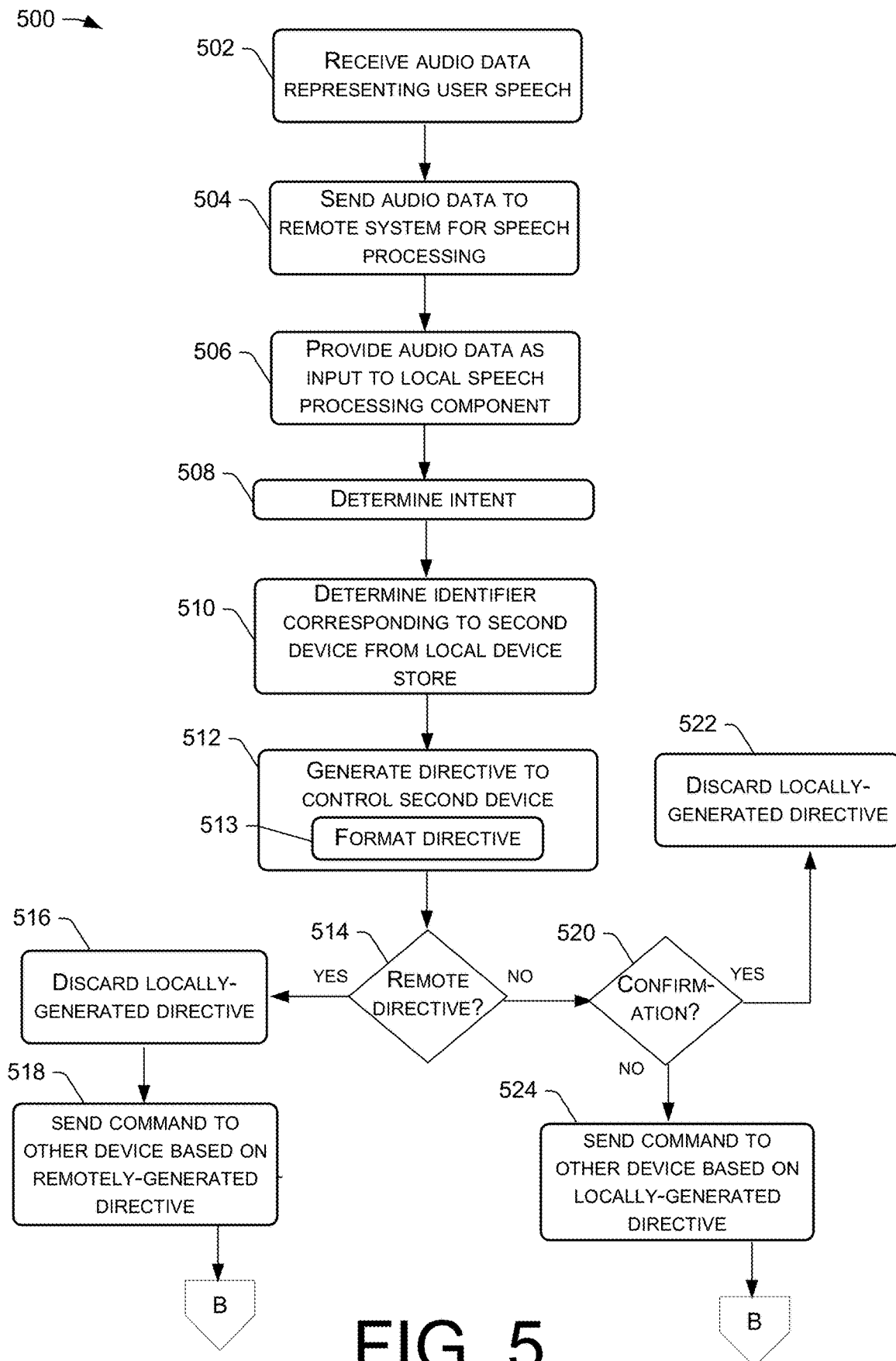
FIG. 5 is a flow diagram of an example process for enabling voice control of second devices via a hub while a connection to a remote system is unavailable.

FIG. 5 is a flow diagram of an example process 500 for enabling voice control of second devices via a hub while a connection to a remote system is unavailable. For discussion purposes, the process 500 is described with reference to the previous figures. In particular, FIG. 5 illustrates a process 500 of enabling local voice control of second devices without making a determination up-front as to where audio data 112/118 is to be routed.

At 502, a hub 102(1) may receive audio data 112/118 that represents user speech. The operation(s) performed at block 502 may be similar to the operation(s) described with reference to block 202 of the process 200.

At 504, the hybrid request selector 120 may send, over the wide area network 110, the audio data 112/118 to a remote speech processing component executing on one or more remote server computers of the remote system 108. The operation(s) performed at block 504 may be similar to the operation(s) described with reference to block 218 of the process 200.

At 506, the hybrid request selector 120 may input the audio data 112/118 to a local speech processing component 122 executing on the hub 102(1). The operation(s) performed at block 506 may be similar to the operation(s) described with reference to block 206 of the process 200. Blocks 504 and 506 may be performed contemporaneously, at different times, and/or in any suitable order. Notably, blocks 504 and 506 may be performed based on the receipt of the audio data 112/118 at block 502, without an intermediate determination regarding where to route the audio data 112/118.

At 508, the local speech processing component 122 may determine, based at least in part on processing the audio data 112/118, intent data. The operation(s) performed at block 508 may be similar to the operation(s) described with reference to block 208 of the process 200.

At 510, the local speech processing component 122 (or perhaps another component of the hub 102(1)) may further determine an identifier of a second device 106 that is collocated in an environment with the hub 102(1), and is to be controlled according to the intent. The operation(s) performed at block 510 may be similar to the operation(s) described with reference to block 210 of the process 200.

At 512, the local speech processing component 122 may generate, as output, directive data based at least in part on the intent data determined at block 508. The operation(s) performed at block 512 may be similar to the operation(s) described with reference to block 212 of the process 200.

At sub-block 513, the directive generated at block 512 may be generated in a same, or a similar, format used by a remote speech processing component to generate directives that are sent from the remote speech processing component to the hub 102(1). The operation(s) performed at sub-block 513 may be similar to the operation(s) described with reference to sub-block 213 of the process 200.

At 514, the hybrid request selector 120 (in receipt of the locally-generated directive) may determine whether a remotely-generated directive was received from the remote system 108. If a remotely-generated directive was received (e.g., within a prescribed time period), the process 500 may follow the "yes" route from block 514 to block 516.

At 516, the hybrid request selector 120 may discard the locally-generated directive that was generated at block 512 by the local speech processing component 122, the discarding based at least in part on the receiving of the remotely-generated directive from the remote system 108. In this scenario, the control engine 134 can send, at block 518, a command 146 (e.g., via a wireless protocol) to a device in the environment based on the remotely-generated directive.

At 514, if a remotely-generated directive was not received (e.g., within a prescribed time period), the process 500 may follow the "no" route from block 514 to block 520.

At 520, the hybrid request selector 120 may determine whether a confirmation that the audio data 112/118 was successfully processed was received from the remote system 108. For example, the remote system 108 may process the audio data 112/118, and, instead of sending a directive back to the hub 102(1), may send a directive to another hub 102, or to the second device 106 directly. In this scenario, the remote system 108 may send a confirmation to the hub 102(1) that it successfully processed the audio data 112/118 and send a directive down to another device. Thus, if a confirmation is received at block 520, the process 500 may follow the "yes" route from block 520 to block 522.

At block 522, the hybrid request selector 120 may discard the locally-generated directive that was generated at block 512 by the local speech processing component 122, the discarding based at least in part on the receiving of the confirmation from the remote system 108. In this case, there is no need for the hub 102(1) to send a command to the second device 106.

At block 520, if no confirmation is received from the remote system 108 (e.g., within a prescribed time period), the process 500 may follow the "no" route from block 520 to block 524.

At 524, a control engine 134 of the hub 102(1) (perhaps in coordination with one or more other components of the hub 102(1), such as a protocol adapter 136, a protocol driver 144, and an antenna) may send a command 146 (e.g., via a wireless protocol) to a device in the environment based on the locally-generated directive that was generated at block 512.

Rule Modality: Returning with reference to FIG. 1, a rule modality of the hub 102(1) will now be described. For execution of rules, the hub 102(1) may include a local rules component 148, as shown in FIG. 1. Rules (sometimes called "automation rules") may specify one or more conditions that, when met, trigger the execution of one or more operations (or actions), such as an operation to be performed at one or more second devices 106. As an example, user 104 may create a rule that a certain operation should occur when the user 104 leaves the house (e.g., through the front door) and when the user returns. For instance, the user 104 may create a rule that the garage door should close and the front door should lock when the user 104 is not home, and that the garage door should open, the front door unlock, and an entry light turn on when the user 104 returns home. These are examples of rules that operate with "event-based" triggers that are triggered by motion detection, or similar sensor-based events. Other types of triggers include, without limitation, "utterance-based" triggers, and "schedule-based" triggers. An example of a rule that uses an utterance-based trigger is one where the bedroom light turns on and the morning news plays from a speech interface device when the user 104 says "Good morning." An example of a rule that uses a schedule-based trigger is one where the upstairs lights turn on and the coffee maker starts at 7:00 AM. Thus, a rule may comprise one or more triggers (invoked when one or more conditions are met) and one or more operations. When a rule includes multiple operations, those operations can be performed in an arbitrary order unless a particular sequence is specified.

As shown in FIG. 1, once a rule is created, the remote system 108 may assigned the rule to the hub 102(1) for detection and execution thereon, and the rule may be synced 150 to a rules store 152 that is stored in local memory of the hub 102(1). Thus, the rules store 152 may store a plurality of rules that are assigned to the hub 102(1) as the owner (i.e., the entity in charge of detecting conditions that trigger the rules and executing the operations for the rules).

When a state change 140 of a second device 106 occurs, such as a sensor on a door detecting a transition from the door being in a closed state to the door being in an open state, the this state change is sent from the second device 106 to the hub 102(1) via a wireless protocol, sent up through the protocol stack (e.g., the protocol adapter 136) to the control engine 134, and received by an event preparation component 154 of the smart home device component 132. The event preparation component 154 may be configured to translate the state change data into an event (e.g., into a language understandable to the local rules component 148 and the remote system 108. Under normal conditions—when a wide area network connection is available to the hub 102(1)—the event may be sent to the remote system 108 for processing of events at the remote system 108. The remote system 108 may keep track of all rules tied to a user account such that rules that cannot be performed in an environment without assistance from the remote system 108 may be triggered and executed under normal conditions, when network connectivity is available.

Additionally, or alternatively, the event may be provided as input to an event transformation component 156 of the local rules component 148. The event transformation component 156 may be a local monitoring component that monitors for the occurrence of conditions that trigger a rule in the rules store 152. A rule execution component 158 may execute rules, by causing operations specified in the rules to be performed. The way in which a rule is executed for controlling a second device 106 may be similar to that described above for the voice control modality (i.e., voice control of second devices 106). For example, the rule execution component 158 may generate a directive that includes an identifier of a second device 106, and an operation to be performed at the second device 106, and this directive may be provided to the smart home device component 132 (e.g., to the directive processing component 130), which translates the directive into a command that the control engine 134 is able to process. The control engine 134 may route the command appropriately, such as through a protocol stack (e.g., the protocol adapter 136 and the protocol driver 144) for second devices 106 that are within wireless communication range of the hub 102(1). Accordingly, the local rules component 148, by virtue of having a subset of rules synched 150 to the rules store 152, is able to detect conditions that trigger those rules without any assistance from the remote system 108, and is able to execute operations of those rules without any assistance from the remote system 108, making the hub 102(1) capable of locally executing rules, without assistance from the remote system 108, in an rule modality.

After successfully executing, or attempting to execute and failing to successfully execute, a rule, this information about rule execution may be sent to the remote system 108 in a reporting 160 transmission. The reporting 160 of rule execution information allows the remote system 108 to track how rules are being executed, including those rules that are executed in an environment, without any assistance from the remote system 108. This may allow the remote system 108 to determine if changes can be made to the rule assignment process to improve the operability of rules. Events may also be sent to the remote system 108 via the reporting 160 channel. If wide area network connectivity is unavailable at the time a rule finishes executing, the hub 102(1) may wait for connectivity to be restored before reporting 160 to the remote system 108.

Figure 6:
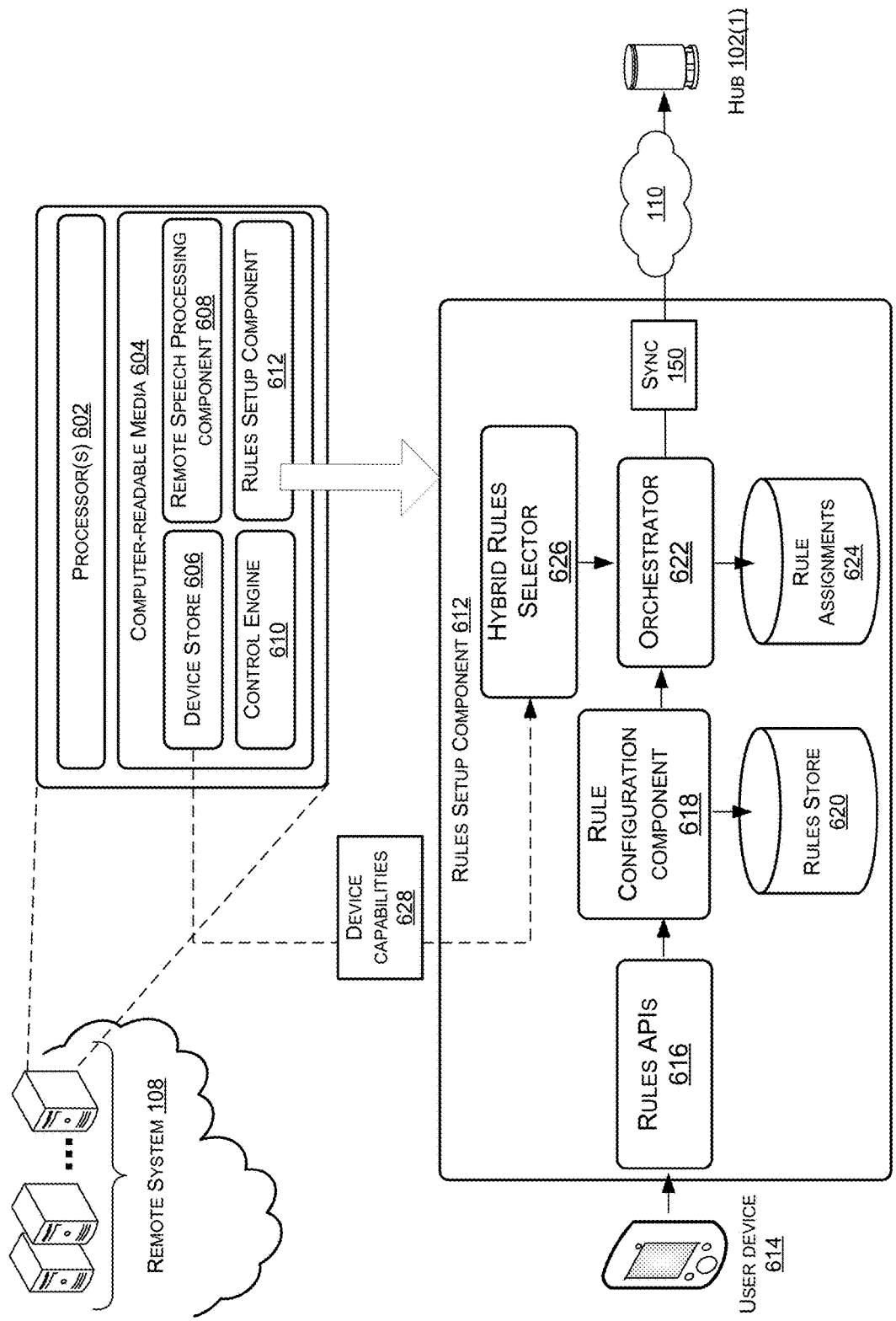
FIG. 6 is a block diagram illustrating an architecture of a remote system, including an example technique for setting up rules and assigning them to owners.

FIG. 6 is a block diagram illustrating an architecture of a remote system 108, including an example technique for setting up rules and assigning them to owners. As illustrated, the remote system 108 may include one or more processors 602 and computer-readable media 604 (or memory 604). Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, compact disc read-only memories (CD-ROMs), digital video discs (DVDs), read-only memories (ROMs), random access memories (RAMs), erasable programmable read-only memories (EPROMs), electrically erasable programmable read-only memories (EEPROMs), flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be by an Internet download. The computer-readable memory 604 may be used to store any number of functional, or executable, components, such as programs, program modules, instructions, and the like that are executable on the processor(s) 602 to be run as software. Each of the modules shown in the memory 604 may comprise computer-executable instructions that, when executed, cause the one or more processors 602 to perform acts and to implement techniques described herein.

The memory 604 may store, among other things, a device store 606, a remote speech processing component 608, a control engine 610, and a rules setup component 612. It is to be appreciated that the architecture of the remote system 108 is greatly simplified, and may include additional components that are not described herein for brevity.

The device store 606 may be configured to track or maintain a current listing of devices registered to particular user accounts, as well as which second devices 106 are controllable by which hubs 102 in a particular environment. The device store 606 may also maintain information about device capabilities (e.g., whether a second device 106 is directly connectable to a hub 102(1) and able to operate in an environment without assistance from the remote system 108). At least a portion of this device store 606 may be synched 134 to a particular hub 132 for local control of second devices 106, as described herein.

The remote speech processing component 608 may be configured to receive audio data 112/118 from speech interface devices, including hubs, such as the hub 102(1) of FIG. 1, to process speech, and generate directives that are sent back to the speech interface devices for performing various functions, including the control of second devices 106. It is to be appreciated that the remote speech processing component 608 may include several additional components, such as ASR, NLU, and the like, to enable robust speech processing at the remote system 108. These details are omitted for brevity.

The control engine 610 may be configured to send directives to hubs 102 in local environments that are used to implement various actions and operations in the environments where the hubs 102 are located. The control engine 610 may effectuate both voice control and rules modalities from the remote system. For example, the remote speech processing component 608 may interface with the control engine 610 to generate directives based on intents derived from user speech. As another example, the control engine 610 may be configured to determine whether rules are triggered, and generate directives based on the operations specified in the triggered rules.

The rules setup component 612, meanwhile, may include functionality for allowing users create rules, such as the rules described herein. A user, such as the user 104, may utilize voice commands (i.e., a voice user interface (VUI)), gestures, and/or a graphical user interface (GUI) of a device, such as a user device 614, to create one or more rules. This creation process may be transmitted to the remote system 108 via one or more rules APIs 616, such as create, read, update, and delete (CRUD) APIs. For example, the user 104 may create a rule that is to turn an entry light on when a front door opens.

A rule configuration component 618 may be configured to setup the user-created rule for triggering and execution. As noted above, a rule may be setup with different types of triggers including, without limitation, event-based triggers, utterance-based triggers, and schedule-based triggers. Thus, the rule configuration component 618 can select a trigger type for the rule, and a trigger adaptor for this type of trigger may be setup. After the setup of the trigger, the rule may be stored in a rules store 620 accessible to the remote system 108. Thus, as users create rules, they may be amassed in the rules store 620 and usable for device control purposes.

In order to enable local execution of rules without assistance from the remote system 108, however, an assignment process may be carried out to determine and select an appropriate "owner" for triggering and executing a rule. The logical construct for the owner may be in the form of a "rule container." Each owner may support a subset of the rules in the rules store 620 of the remote system 108, and may have its own triggering and execution mechanism. An example of this is shown in FIG. 1, where the hub 102(1) can be assigned a subset of rules as the owner of the subset of rules.

An orchestrator 622 may be in charge of assigning newly created rules to owners, and storing those rule assignments 624 for later reference. In the simple case of determining whether to assign a newly created rule to the remote system 108 as the owner or the hub 102(1) as the owner, the orchestrator 622 may be configured to traverse through this list of owners (perhaps in a prioritized order), each time asking the corresponding owner whether it can support a given rule. In order to make this determination, a hybrid rules selector 626 may receive device capabilities 628 from the device store 606, and may determine which rules 620, or subsets of the rules 620, are capable of being detected and capable of executing in an environment, without assistance from the remote system 108. For example, for the rule where an entry light is to be turned on when the front door opens, the hybrid rules selector 626 may pull device capabilities 628 for a door sensor and for the entry light (both second devices 106) from the device store 606. In doing so, the hybrid rules selector 626 may determine that both the door sensor and the entry light are able to communicate with the hub 102(1) directly, and without assistance from the remote system 108. Thus, the door sensor may be capable of sending a state change 140 signal to the hub 102(1) directly, and while a wide area network connection is unavailable. Likewise, the entry light may be capable of receiving a command 146 directly from the hub 102(1), and while a wide area network connection is unavailable. Thus, a newly created rule that is to turn on the entry light when the front door is opened may be designated, by the hybrid rules selector 626, as a "locally-executable rule" that is capable of detection and execution in an environment, without assistance from the remote system 108. A rule may be considered a "locally-executable rule" when it can be both triggered, and all the operations can be executed, in an environment, without any assistance from the remote system 108.

The determinations from the hybrid rules selector 626 may be fed into the orchestrator 622, and the orchestrator 622 may factor into its assignment decision whether the rule is designated as a locally-executable rule by the hybrid rules selector 626. Other factors may be considered in the orchestrator's 622 assignment decision. For example, the orchestrator 622 may also consider whether remote system-based control of the rule would give a richer experience to the user 104 in the process of determining an owner for the rule. For instance, if the rule is to play a song as an alarm at 6:30 AM, the remote system 108 may be able to stream the entire song, whereas, in a situation where a connection to a remote system 108 is unavailable, a resource constrained hub 102 (1) may download a snippet of the song to play as the alarm during local execution of the rule. In this case, even though the rule can be considered a "locally-executable rule" in that it is detectable and executable without assistance from the remote system 108, the orchestrator component 622 may determine to assign the rule for execution by the remote system 108 to provide the user 104 with a richer experience (e.g., an entire song streamed for the alarm, rather than a snippet of the song).

Latency may be another factor considered by the orchestrator 622 in its assignment decision. For instance, the orchestrator 622 may assign a locally-executable rule to the hub 102(1) as the owner of the rule when latency—as measured from a time when the rule is triggered to a time when the rule is execution—cannot exceed a threshold latency (e.g., a latency no greater than 50 milliseconds). The orchestrator 622 may have a history of rule executions due to the reporting 160 described with respect to FIG. 1, may use this information to determine whether the rule can be executed with a latency that does not exceed some threshold latency if it were to be assigned to the remote system 108 as the owner, and/or whether the rule can be executed with the a latency that does not exceed the threshold latency if it were to be assigned to a hub, such as the hub 102(1), as the owner.

Yet another factor in the orchestrator's 622 assignment decision may be whether there is a sequence in which the operations of the rule are to be performed. For example, a rule may indicate that operation A is to be performed before operation B is performed. If either of the operations (A or B) cannot be executed locally in an environment without assistance from the remote system 108, this may cause the orchestrator to assign the rule to the remote system 108 for detecting and executing the rule. This may be more relevant with "hybrid rules."

A "hybrid rule" is one where a subset of the rule (e.g., a trigger or a subset of operations of multiple operations) cannot execute locally in an environment without assistance from the remote system 108, while a remainder of the rule (e.g., other triggers or operations) can execute locally in an environment without assistance from the remote system 108. The orchestrator 622 may determine that the rule created by the user 104 is a hybrid rule, and may determine to assign the rule to the remote system 108 for remote system-based detection and execution of the rule. Alternatively, a hybrid rule may be partitioned into mini-rules, some of which can be executed locally, without assistance from the remote system 108, and some which cannot be executed locally, without assistance from the remote system 108. The locally-executable mini-rules may then be assigned to a hub 102(1) for local execution, such as when a wide area network connection is unavailable, while the entire hybrid rule may be assigned to the remote system 108 for remote system-based execution in instances when the hub 102(1) can communicate with the remote system 108.

Another type of rule is an "online rule." As its name implies, an online rule is a rule that either cannot be triggered locally in an environment, without assistance from the remote system 108, or none of the operations can be executed locally in an environment, without assistance from the remote system 108, or both. An example of an online rule might be one that is triggered if a particular football team scores a touchdown. This event-based trigger cannot be detected by the hub 102(1) without a wide area network connection. Another example of an online rule might be one that involves an operation of streaming, over the wide area network 110, a broadcast of the latest news when the rule is triggered.

In any case, after the orchestrator 622 assigns a rule to the hub 102(1) as the owner of the rule, the rule may be synched 150 to the hub 102(1), as described with reference to FIG. 1. Thus, the hub 102(1) may maintain, in local memory, a subset of rules that are detectable and executable locally in an environment, without assistance from the remote system 108.

Figure 7:
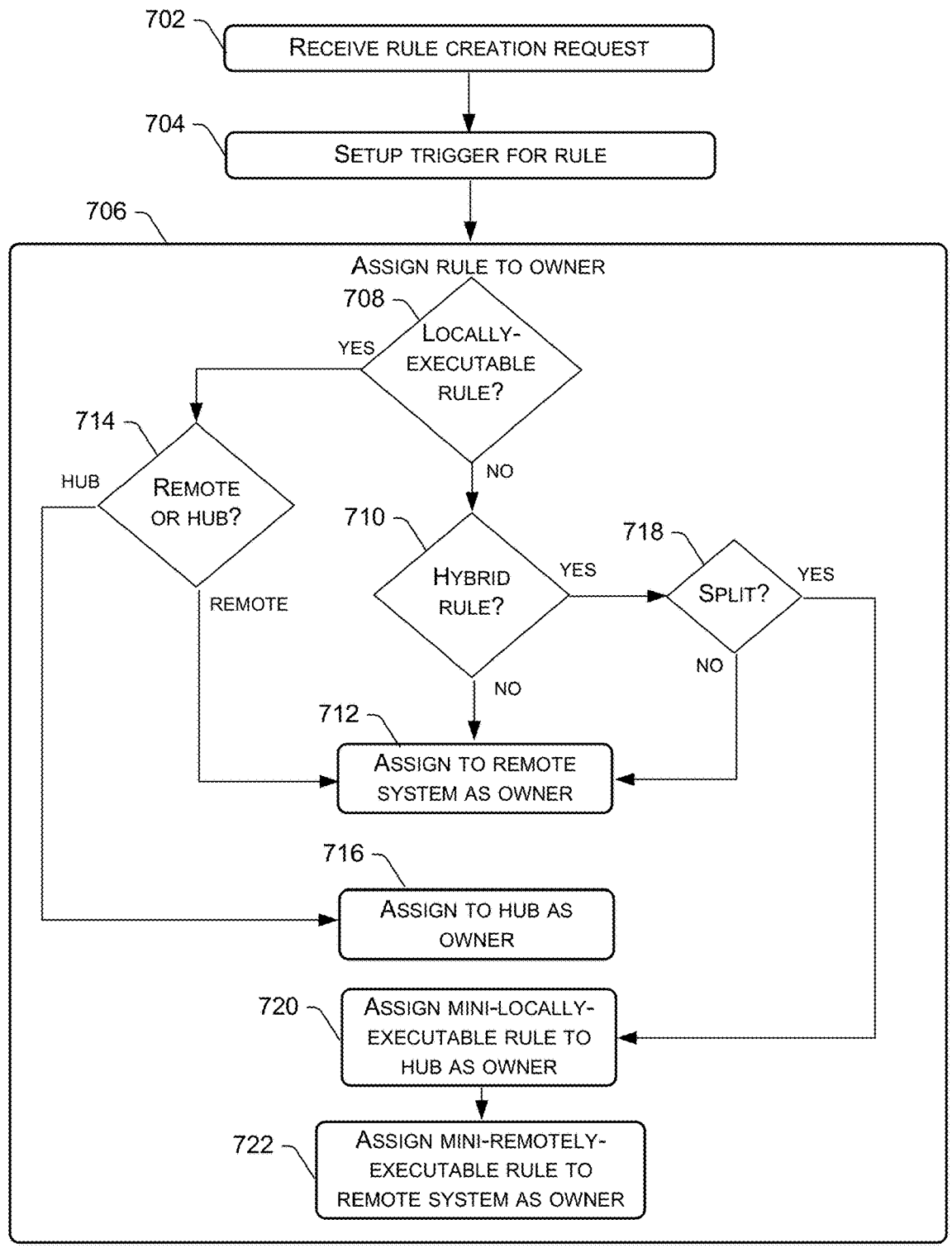
FIG. 7 is a flow diagram of an example process for setting up rules and assigning them to owners.

FIG. 7 is a flow diagram of an example process 700 for setting up rules and assigning them to owners. For discussion purposes, the process 700 is described with reference to the previous figures.

At 702, the rules setup component 612 of the remote system 108 may receive, from a user device 614, a creation request for creating a rule. The creation request may be made by a user 104 using any suitable user interface provided by the user device 614, as described herein. In an example, the user 104 may request creation of a rule to turn on a light and to start streaming a broadcast of the latest news at 7:00 AM.

At 704, the rules setup component 612 of the remote system 108 may setup a trigger for the rule. Setting up a trigger for the rule may include selecting a type of trigger among multiple available types of triggers. In the running example, a schedule-based trigger may be selected for the rule to turn on a light and to start streaming a broadcast of the latest news at 7:00 AM. Setting up a trigger for the rule may further include enabling a trigger adapter to monitor for the current time of 7:00 AM.

At 706, the orchestrator 622 of the remote system 108 may assign the rule to an owner, such as the remote system 108 or the hub 102(1). This assignment operation may consider several factors shown by the sub-blocks of block 706.

At block 708, the orchestrator 622 may determine whether the rule can be designated as a "locally-executable rule." This may involve analyzing the condition(s) that triggers the rule, and analyzing the operation(s) of the rule to determine whether any part of the rule is capable of being carried out in an environment, without assistance from the remote system 108. These determinations may include determining capabilities of second devices 106 that are to generate events for triggers, and/or to perform operations, and whether those second devices 106 are devices that can be directly controlled via the hub 102(1), without any assistance from the remote system 108. If any part of the rule cannot be performed locally in an environment without assistance from the remote system 108, the process 700 may follow the "no" route from block 708 to block 710.

At 710, the orchestrator 622 may determine whether the rule can be designated as "hybrid rule" by determining if some parts can be performed without assistance from the remote system 108 and other parts cannot be performed without assistance from the remote system 108. If no parts of the rule can be performed without assistance from the remote system 108, the process 700 may follow the "no" route from block 710 to block 712, where the rule may be assigned to the remote system 108 as the owner because the rule is an "online rule."

At block 708, if the orchestrator 622 determines that the rule can be designated as a "locally-executable rule," the process 700 may follow the "yes" route from block 708 to block 714.

At block 714, the orchestrator 622 may consider additional factors in determining whether to assign the "locally-executable rule" to the remote system 108 or the hub 102 as the owner. This may include determining whether the rule is to be performed within a threshold latency, as described herein, and/or whether detection and/or control of the rule by the remote system 108 can offer a richer experience. It may be the case that latency does not matter and/or the remote system 108 can provide a richer experience, and, in this case, the locally-executable rule may be assigned to the remote system 108 as the owner at block 712.

If, on the other hand, the orchestrator 622 determines that factor such as latency is of a concern and that the hub 102(1) can execute the rule within a threshold latency while the remote system 108 cannot, the "locally-executable rule" may be assigned to the hub 102(1) as the owner at block 716. This may involve synching 150 the "locally-executable rule" down to the hub 102(1), as described herein. Additionally, or alternatively, if the remote system 108 does not necessarily provide a richer experience, the "locally-executable rule" may be assigned to the hub 102(1) as the owner at block 716. These and other factors may be considered at block 714 to make the determination as to which owner a "locally-executable rule" is to be assigned.

If, at block 710, the rule is determined to be a "hybrid rule," the process 700 may follow the "yes" route from block 710 to block 718. In the running example of a rule to turn on a light and to start streaming a broadcast of the latest news at 7:00 AM, this requested rule can be designated as a "hybrid rule" because at least part of the rule can be performed locally in an environment, without assistance from the remote system 108. That is, the schedule-based trigger can be detected by a hub 102(1) implementing the trigger adapter with a clock that tracks the current time. In addition, the light may be a second device 106 that can be controlled by the hub 102(1) via a direct wireless connection, without any assistance from the remote system 108. Thus, the operation of turning on the light is an operation that can be carried out without assistance from the remote system 108. However, the operation of streaming a broadcast of the latest news may rely on an Internet connection, and may, therefore, not be capable of being carried out without assistance from the remote system 108.

At 718, the orchestrator 622 may determine whether to split a hybrid rule into one or more "mini-locally-executable rules" and one or more "mini-remotely-executable rules." In the running example, a mini-locally-executable rule may be created to turn on the light at 7:00 AM, and this mini-locally-executable rule may be assigned to the hub 102(1) as the owner of the mini-locally-executable rule at block 720. Thus, when the hub 102(1) is unable to connect to the remote system 108, the mini-locally-executable rule can be performed to turn on the light at 7:00 AM, without streaming the broadcast of the latest news because the hub 102(1) cannot perform the streaming operation without the Internet. Meanwhile, a mini-remotely-executable rule can be assigned to the remote system 108 as the owner at block 722 so that the rule can be triggered and executed from the remote system 108 when the hub 102(1) does have wide area network connectivity. This allows the entire hybrid rule to be performed when the hub 102(1) is able to communicate with the remote system 108.

If, at block 718, the orchestrator 622 determines to not split off any mini-locally-executable rules from the hybrid rule, the process 700 may follow the "no" route from block 718 to assign the hybrid rule to the remote system 108 as the owner at block 712. The determination to refrain from splitting off any mini-locally-executable rules from the hybrid rule means that the hybrid rule may not be executed if the hub 102(1) is unable to connect to the remote system 108 when the hybrid rule would otherwise have been triggered. In some embodiments, the determination as to whether to split off mini-locally-executable rules from the hybrid rule may take into consideration whether the operations of the hybrid rule are to be performed in a particular sequence. For example, if an operation capable of being carried out without assistance from the remote system 108 is to be performed after an online operation, it may not make sense to split off a mini-locally-executable rule to have the offline operation execute when the mini-locally-executable rule is triggered because the operation capable of being carried out without assistance from the remote system 108 cannot be executed until the online operation is executed. Thus, order of operations in a hybrid rule may factor into the decision at block 718.

Figure 8:
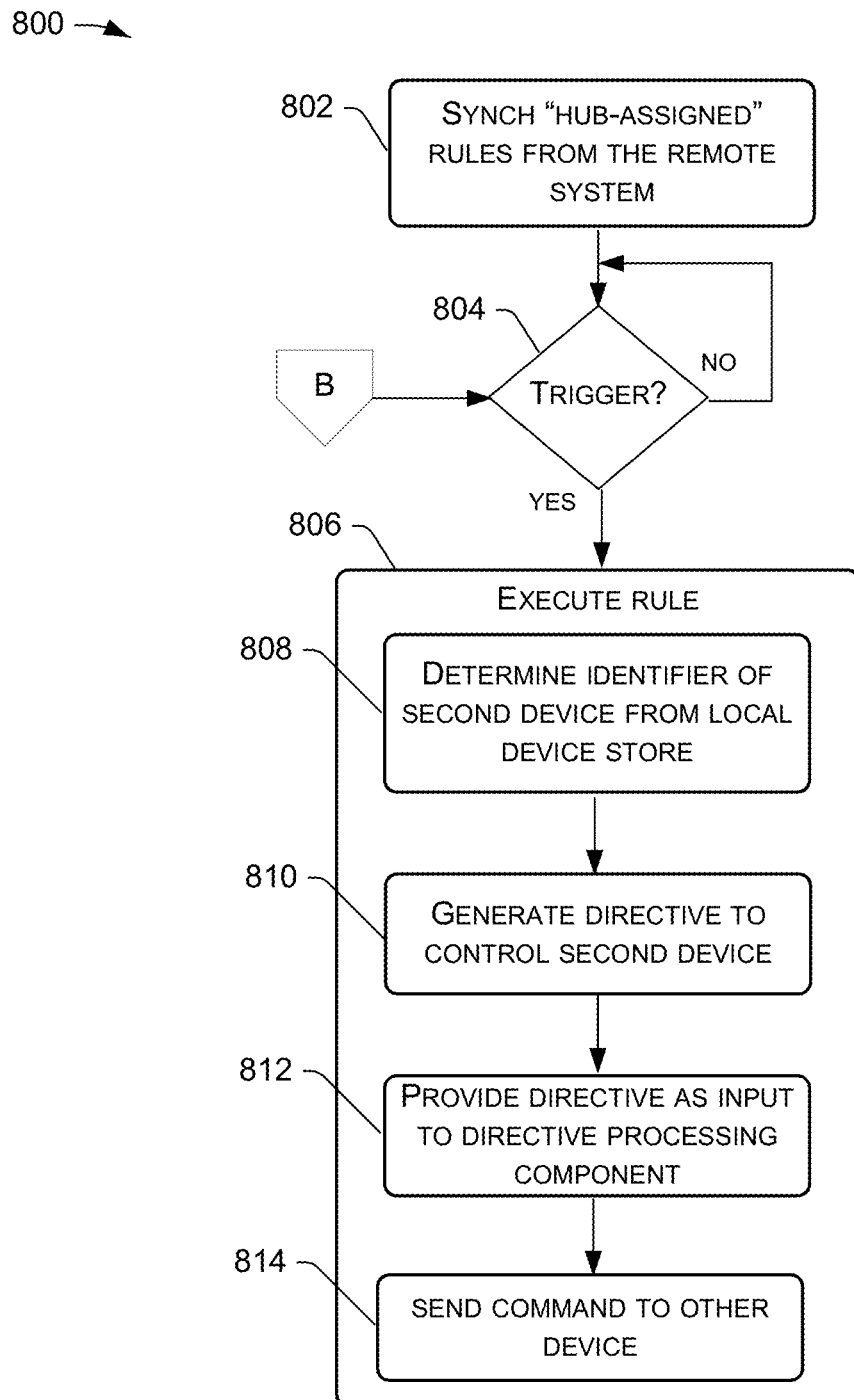
FIG. 8 is a flow diagram of an example process for execution of a rule by a hub while a connection to a remote system is unavailable.

FIG. 8 is a flow diagram of an example process 800 for local execution of a rule. For discussion purposes, the process 800 is described with reference to the previous figures.

At 802, the hub 102(1) may synch 150 rules that are assigned to the hub 102(1) as the owner of the rules. This may be done periodically, whenever a new rule is created, or at any other suitable time. The synched rules may be stored in local memory of the hub 102(1), such as within the rules store 152 shown in FIG. 1.

At 804, the local rules component 148 may monitor for conditions that trigger any of the rules in the rules store 152 of the hub 102(1). Triggering conditions for locally-executable rules may include, without limitation, events (e.g., based on state changes 140 of second devices 106), voice commands, and/or the current time). Furthermore, as shown by the off-page reference "B" in FIGS. 2, 5, and 8, the operation performed at a second device 106 resulting from the command sent at blocks 216 or 222 of FIG. 2 (or blocks 518 or 524 of FIG. 5) may trigger a rule, such as a locally-executable rule. Until a rule is triggered, the process 800 may iterate by following the "no" route from block 804 to continue monitoring for a rule trigger. Once a rule is triggered, the process 800 may follow the "yes" route from block 804 to block 806.

At 806, the hub 102(1) may execute the rule. This may involve various sub-operations.

At 808, the hub 102(1) may access the local device store 132 to identify a second device 106 (e.g., a light) to be controlled for the rule.

At 810, the rule execution component 158 may generate a directive corresponding to the operation specified in the rule. For example, the directive may be a directive to turn on a light (e.g., control a second device 106).

At 812, the rule execution component 158 may provide the directive as input to the directive processing component 130. The directive processing component 130 may be configured to receive remotely-generated directives based on remote determinations that rules have been triggered. Thus, the directive processing may be transparent to downstream components, and the directive processing component 130 may not be concerned with the source of the directive.

At 814, the control engine 134 of the hub 102(1) (perhaps in coordination with one or more other components of the hub 102(1), such as a protocol adapter 136, a protocol driver 144, and an antenna) may send a command 146 via a wireless protocol to a device in the environment. The command 146 may instruct the operation specified in the directive to be performed at the second device 106 (e.g., to turn on a light 106(3)). The device that receives the command 146 from the hub 102(1) may be the second device 106 at which the operation is to be performed, or the device may be an intermediate device, such as a secondary hub 102(2) that is within wireless communication range of the second device 106. Thus, the command 146 may be sent directly from the hub 102(1) to the second device 106, or indirectly to the second device 106 via an intermediate, secondary hub 102(2). In either case, the wireless transmission of the command 146 from the hub 102(1) to the second device 106 does not involve transmitting the command 146 over the wide area network 110. For instance, BLE protocol, Zigbee protocol, WiFi protocol (over a local area network), or another IoT protocol may be utilized at block 814.

Figure 9:
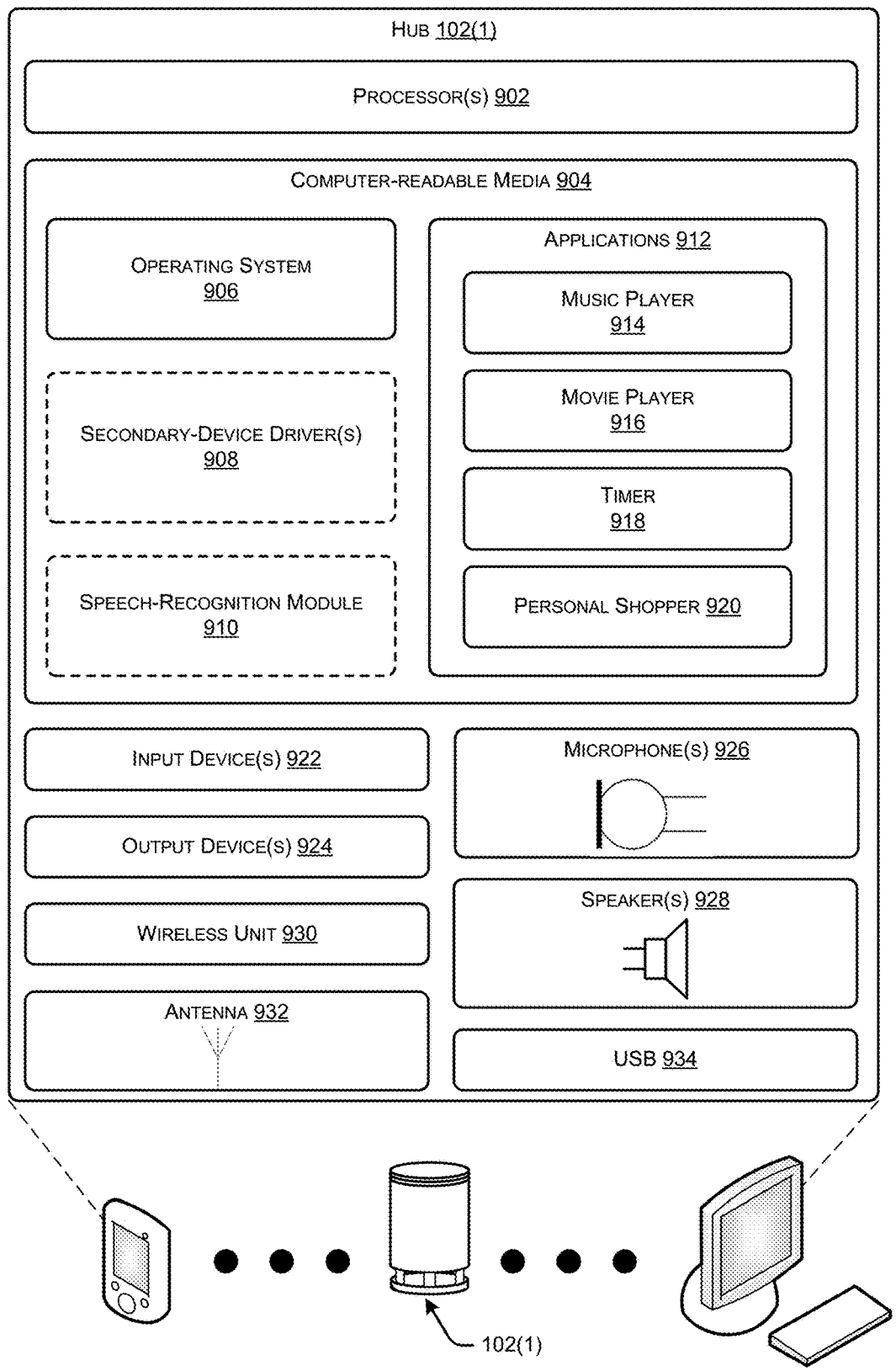
FIG. 9 illustrates example components of an electronic device, such as the hub of FIG. 1.

FIG. 9 illustrates example components of an electronic device, such as the hub 102(1) of FIG. 1. The hub 102(1) may be implemented as a standalone device that is relatively simple in terms of functional capabilities with limited input/output components, memory, and processing capabilities. For instance, the hub 102(1) does not have a keyboard, keypad, or other form of mechanical input. Nor does it have a display (other than simple lights, for instance) or touch screen to facilitate visual presentation and user touch input. Instead, the hub 102(1) may be implemented with the ability to receive and output audio, a network interface (wireless or wire-based), power, and processing/memory capabilities. In certain implementations, a limited set of one or more input components may be employed (e.g., a dedicated button to initiate a configuration, power on/off, etc.). Nonetheless, the primary and potentially only mode of user interaction with the hub 102(1) is through voice input and audible output.

The hub 102(1) may also be implemented in other form factors, such as a mobile device (e.g., a smart phone or personal digital assistant). The mobile device may include a touch-sensitive display screen and various buttons for providing input as well as additional functionality such as the ability to send and receive telephone calls. Alternative implementations of the hub 102(1) may also include configuration as a personal computer. The personal computer may include a keyboard, a mouse, a display screen, and any other hardware or functionality that is typically found on a desktop, notebook, netbook, or other personal computing devices. These devices, however, are merely examples and not intended to be limiting, as the techniques described in this disclosure may be used in essentially any device that has an ability to recognize speech input or other types of natural language input.

In the illustrated implementation, the hub 102(1) includes one or more processors 902 and computer-readable media 904. In some implementations, the processors(s) 902 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 902 may possess its own local memory, which also may store program modules, program data, and/or one or more operating systems.

The computer-readable media 904 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 904 may be implemented as computer-readable storage media ("CRSM"), which may be any available physical media accessible by the processor(s) 902 to execute instructions stored on the memory 904. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 902.

Several modules such as instruction, datastores, and so forth may be stored within the computer-readable media 904 and configured to execute on the processor(s) 902. A few example functional modules are shown as applications stored in the computer-readable media 904 and executed on the processor(s) 902, although the same functionality may alternatively be implemented in hardware, firmware, or as a system on a chip (SOC).

An operating system module 906 may be configured to manage hardware within and coupled to the hub 102(1) for the benefit of other modules. In addition, in some instances the hub 102(1) may include some or all of one or more secondary-device drivers 908. In other instances, meanwhile, the hub 102(1) may be free from the drivers 908 for interacting with second devices. The hub 102(1) may further including, in some instances, a speech-recognition module 910, which may correspond to the local speech processing component 122 described with reference to FIG. 1.

The hub 102(1) may also include a plurality of applications 912 stored in the computer-readable media 904 or otherwise accessible to the hub 102(1). In this implementation, the applications 912 are a music player 914, a movie player 916, a timer 918, and a personal shopper 920. However, the hub 102(1) may include any number or type of applications and is not limited to the specific examples shown here. The music player 914 may be configured to play songs or other audio files. The movie player 916 may be configured to play movies or other audio visual media. The timer 918 may be configured to provide the functions of a simple timing device and clock. The personal shopper 920 may be configured to assist a user in purchasing items from web-based merchants.

Generally, the hub 102(1) has input devices 922 and output devices 924. The input devices 922 may include a keyboard, keypad, mouse, touch screen, joystick, control buttons, etc. In some implementations, one or more microphones 926 may function as input devices 922 to receive audio input, such as user voice input. The output devices 924 may include a display, a light element (e.g., LED), a vibrator to create haptic sensations, or the like. In some implementations, one or more speakers 928 may function as output devices 924 to output audio sounds.

A user 104 may interact with the hub 102(1) by speaking to it, and the one or more microphone(s) 926 captures the user's speech. The hub 102(1) can communicate back to the user by emitting audible statements through the speaker 928. In this manner, the user 104 can interact with the hub 102(1) solely through speech, without use of a keyboard or display.

The hub 102(1) may further include a wireless unit 930 coupled to an antenna 932 to facilitate a wireless connection to a network. The wireless unit 930 may implement one or more of various wireless technologies, such as Wi-Fi, Bluetooth, RF, and so on. A USB port 934 may further be provided as part of the hub 102(1) to facilitate a wired connection to a network, or a plug-in network device that communicates with other wireless networks. In addition to the USB port 934, or as an alternative thereto, other forms of wired connections may be employed, such as a broadband connection.

Accordingly, when implemented as the primarily-voice-operated hub 102(1), there may be no input devices, such as navigation buttons, keypads, joysticks, keyboards, touch screens, and the like other than the microphone(s) 926. Further, there may be no output such as a display for text or graphical output. The speaker(s) 928 may be the main output device. In one implementation, the hub 102(1) may include non-input control mechanisms, such as basic volume control button(s) for increasing/decreasing volume, as well as power and reset buttons. There may also be a simple light element (e.g., LED) to indicate a state such as, for example, when power is on.

Accordingly, the hub 102(1) may be implemented as an aesthetically appealing device with smooth and rounded surfaces, with one or more apertures for passage of sound waves. The hub 102(1) may merely have a power cord and optionally a wired interface (e.g., broadband, USB, etc.). As a result, the hub 102(1) may be generally produced at a low cost. Once plugged in, the hub 102(1) may automatically self-configure, or with slight aid of the user, and be ready to use. In other implementations, other I/O components may be added to this basic model, such as specialty buttons, a keypad, display, and the like.

Figure 10:
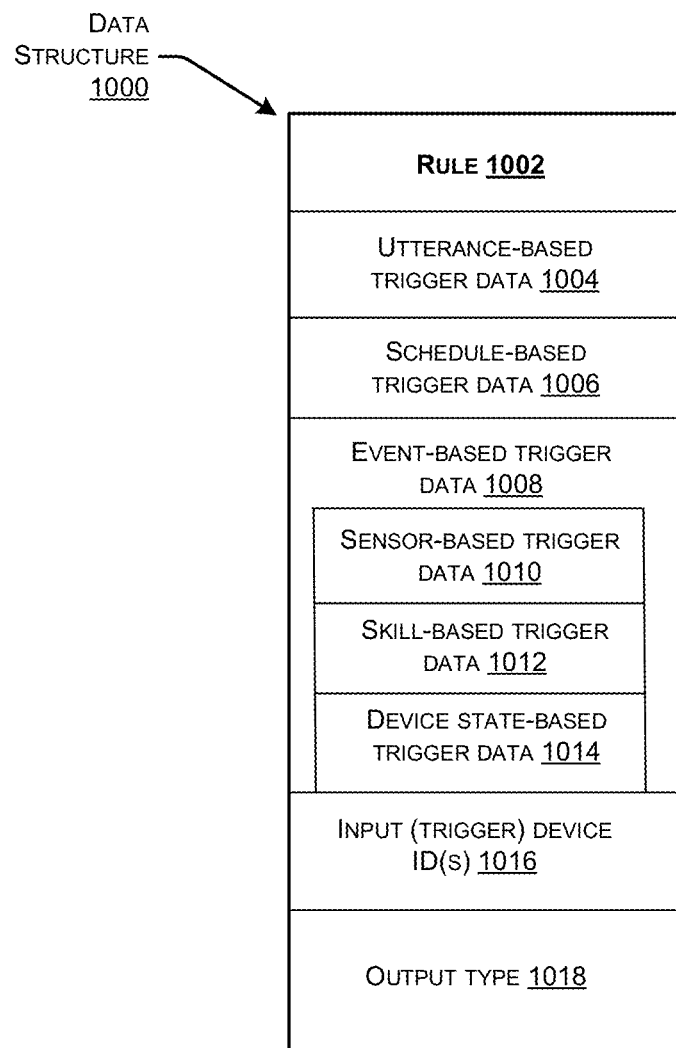
FIG. 10 illustrates an example data structure for a rule that may be stored in the rules store of the hub.

FIG. 10 illustrates an example data structure 1000 for a rule 1002 that may be stored in the rules store 152 of the hub 102(1). The example data structure 1000 is shown as including various example components, and it is to be appreciated that the components of the data structure 1000 are not limited to those shown in FIG. 10, and further that a data structure 1000 may include a subset of the components shown in FIG. 10.

The data structure 1000 of the rule 1002 may include utterance-based trigger data 1004. This may include predefined expressions (e.g., phrases or words) that, when uttered by a user in the vicinity of the hub 102(1), trigger the execution of the rule 1002. For example, the expression ("good morning") may be specified in the utterance-based trigger data 1004 to trigger a rule 1002 that turns on a light when "good morning" is uttered by the user 104.

The data structure 1000 of the rule 1002 may include schedule-based trigger data 1006. This may include a time of day, a day of the week, a month, a season, or any other suitable time-based data that may trigger the rule 1002.

The data structure 1000 of the rule 1002 may include event-based trigger data 1008. Events may be based on receiving data from a particular sensor in the environment of the hub 102(1). As such, the event-based trigger data 1008 may include sensor-based trigger data 1010 that may specify sensors (e.g., by a device identifier) that may trigger the rule 1002. The event-based trigger data 1008 may include skill-based trigger data 1012 that may specify skills that may trigger the rule 1002. The event-based trigger data 1008 may include device state-based trigger data 1014 that may specify states of particular devices that may trigger the rule 1002. For example, a light being turned on (i.e., toggled to an "on" state) may trigger the rule 1002.

The data structure 1000 of the rule 1002 may include an input (trigger) device identifier(s) 1016. This may specify one or more devices that may trigger the rule 1002. This may correspond to any of the sensors specified in the sensor-based trigger data 1010, or possibly different input devices, such as a second speech interface device.

The data structure 1000 of the rule 1002 may include an output action 1018, such as sending a command to a (target) device identifier(s). Thus, the output action 1018 may specify one or more devices that may represent a target device(s) at which an operation is to be performed. For example, an identifier(s) of a light(s) may be specified in the data structure 1000 with an output type 1018 in the form of a control action for a (target) device identifier(s). In other examples, the output action 1018 may specify actions such as output audio on a speaker(s), output content on a display(s), etc.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
one or more processors; and
memory storing instructions that, when executed by the one or more processors, cause the one or more processors to:
receive, based at least in part on user input to a graphical user interface, request data indicating a user request to define to associate a rule that specifies an action to be performed by a first device associated with a user account;
store, in a data store, first data specifying a word that, when identified from audio data that represents user speech, causes performance of the action;
receive, from a second device associated with the user account, the audio data;

determine, based at least in part on analysis of the audio data, that the word is associated with the audio data; and send, based at least in part on determining that the word is associated with the audio data, directive data to the first device to cause the performance of the action.

2. The system of claim 1, wherein the first data specifies multiple actions including the action, and wherein sending the directive data causes performance of the multiple actions.

3. The system of claim 2, wherein the first data specifies a sequence in which the multiple actions are to be performed, and wherein sending the directive data causes the performance of the multiple actions in the sequence.

4. The system of claim 1, wherein the directive data includes an identifier of the first device.

5. The system of claim 4, wherein the performance of the action causes a state of the first device to change.

6. The system of claim 1, wherein the performance of the action comprises outputting audio via a speaker of the first device.

7. A method comprising:
receiving, based at least in part on user input to a graphical user interface, request data indicating a user request to define a rule that specifies an operation to be performed by a first device associated with a user account;
storing, in a data store, first data specifying a word that, when identified from audio data that represents user speech, causes performance of the operation;
receiving, from a second device associated with the user account, the audio data;
determining, based at least in part on analysis of the audio data, that the word is associated with the audio data; and
causing, based at least in part on the determining that the word is associated with the audio data, the performance of the operation.

8. The method of claim 7, wherein the first data specifies multiple operations including the operation, and wherein the causing of the performance of the operation comprises causing performance of the multiple operations.

9. The method of claim 8, wherein the first data specifies a sequence in which the multiple operations are to be performed, and wherein the causing of the performance of the multiple operations comprises causing the performance of the multiple operations in the sequence.

10. The method of claim 7, wherein the causing of the performance of the operation comprises sending the directive data to the first device to cause the performance of the operation.

11. The method of claim 10, wherein the directive data includes an identifier of the first device.

12. The method of claim 11, wherein the second device is collocated in an environment with the first device.

13. The method of claim 11, wherein the performance of the operation causes a state of the first device to change.

14. The method of claim 10, wherein the performance of the operation comprises outputting content via a display of the first device.

15. A method comprising:
receiving, based at least in part on user input to a graphical user interface, request data indicating a user request to define a rule that specifies an operation to be performed by a first device associated with a user account;
storing, in a data store, first data specifying an event that, upon occurrence causes the operation to be performed;
determining that the event has occurred; and
sending, based at least in part on the determining that the event has occurred, directive data to the first device to cause performance of the operation.

16. The method of claim 15, further comprising receiving event data from the first device, wherein the determining that the event has occurred is based at least in part on an analysis of the event data.

17. The method of claim 15, wherein the first data specifies a time, the method further comprising determining that a current time corresponds to the time, and wherein the determining that the event has occurred is based at least in part on the determining that the current time corresponds to the time.

18. The method of claim 15, wherein the first data specifies multiple operations including the operation, and wherein the sending of the directive data causes performance of the multiple operations.

19. The method of claim 18, wherein the first data specifies a sequence in which the multiple operations are to be performed, and wherein the sending of the directive data causes the performance of the multiple operations in the sequence.

20. The method of claim 15, wherein the directive data includes an identifier of the first device.

* * * * *